US011120252B2

United States Patent
Guo et al.

(10) Patent No.: US 11,120,252 B2
(45) Date of Patent: Sep. 14, 2021

(54) METHODS, SYSTEMS, AND MEDIA FOR EVALUATING IMAGES

(71) Applicant: ZHEJIANG DAHUA TECHNOLOGY CO., LTD., Zhejiang (CN)

(72) Inventors: Siyu Guo, Hangzhou (CN); Haiyang Wang, Hangzhou (CN); Jingsong Hao, Hangzhou (CN); Gang Wang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 118 days.

(21) Appl. No.: 16/455,824

(22) Filed: Jun. 28, 2019

(65) Prior Publication Data

US 2019/0318154 A1 Oct. 17, 2019

Related U.S. Application Data

(63) Continuation of application No. PCT/CN2017/118598, filed on Dec. 26, 2017.

(30) Foreign Application Priority Data

Dec. 28, 2016 (CN) .......................... 201611237293.0
Dec. 28, 2016 (CN) .......................... 201611237296.4

(51) Int. Cl.
 *G06K 9/00* (2006.01)
 *G06K 9/03* (2006.01)
 *G06K 9/52* (2006.01)
(52) U.S. Cl.
 CPC ......... *G06K 9/00261* (2013.01); *G06K 9/036* (2013.01); *G06K 9/522* (2013.01)

(58) Field of Classification Search
 CPC ........... G06K 9/00221; G06K 9/00228; G06K 9/00261; G06K 9/036; G06K 9/522;
 (Continued)

(56) References Cited

U.S. PATENT DOCUMENTS 9,228,858 B2 1/2016 Ohtomo et al. ..... G01D 5/3473
9,329,762 B1 5/2016 Schultz et al.
(Continued)

FOREIGN PATENT DOCUMENTS

CN 101567044 A 10/2009
CN 101794389 A 8/2010
(Continued)

OTHER PUBLICATIONS

Third Office Action in Chinese Application No. 201511237293.0 dated Jun. 30, 2020, 10 Pages.
The Extended European Search Report in European Application No. 17888585.1 dated Nov. 15, 2019, 10 pages.
Kim Hyung-Il et al., Face Image Assessment Learned with Objective and Relative Face Image Qualities for Improved Face Recognition, 2015 IEEE International Conference on Image Processing (ICIP), 4027-4031, 2015.

(Continued)

*Primary Examiner* — Andrew W Johns
(74) *Attorney, Agent, or Firm* — Metis IP LLC

(57) ABSTRACT

A method may include obtaining an image including a face. The method may further include determining at least one time domain feature related to the face in the image and at least one frequency domain information related to the face in the image. The method may further include evaluating the quality of the image based on the at least one time domain feature and the frequency domain information.

12 Claims, 18 Drawing Sheets

(58) Field of Classification Search
CPC . G06T 7/20; G06T 7/262; G06T 2207/20048; G06T 2207/30201
See application file for complete search history.

(56) References Cited

U.S. PATENT DOCUMENTS

| | | | |
|---|---|---|---|
| 2005/0089246 A1* | 4/2005 | Luo | G06K 9/00268 382/286 |
| 2016/0210500 A1 | 7/2016 | Feng et al. | G06K 9/00288 |
| 2017/0091553 A1 | 3/2017 | Liu et al. | G06K 9/00697 |
| 2019/0318154 A1 | 10/2019 | Guo et al. | |

FOREIGN PATENT DOCUMENTS

| | | |
|---|---|---|
| CN | 102799877 A | 11/2012 |
| CN | 103605965 A | 2/2014 |
| CN | 104408399 A | 3/2015 |
| CN | 104834919 A | 8/2015 |
| CN | 106202089 A | 12/2016 |
| CN | 106778660 A | 5/2017 |
| CN | 106803067 A | 6/2017 |
| KR | 20160119932 A | 10/2016 |
| WO | 2016110030 A1 | 7/2016 |
| WO | 105844276 A | 8/2016 |
| WO | 2017198040 A1 | 11/2017 |

OTHER PUBLICATIONS

Xiao-Hua Chen et al., Image Quality Assessment Model Based on Features and Applications in Face Recognition, 2011 IEEE International Conference on, 2011, 4 pages.
Xuande Zhang et al., Edge Strength Similarity for Image Quality Assessment, IEEE Signal Processing Letters, 20(4):319-322, 2013.
Jianhua Luo et al., Qualitative Evaluation of Image, Singular Information Theory and Its Application, 38-41, 2015, Chapter 3 Spectrun Extension Error Evaluation.
International Search Report in PCT/CN2017/118598 dated Mar. 30, 2018, 4 pages.
Written Opinion in PCT/CN2017/118598 dated Mar. 30, 2018, 6 pages.
Chai Xiujuan et al., Pose and Illumination Invariant Face Recognition Based on 3D Face Reconstruction, Journal of Software, 17(3): 524-534, 2006.
Ding Lijun et al., Clifford Algebra Approach for 3D Face Pose Correction, Journal of Chinese Computer Systems, 34(4): 906-909, 2013.
First Office Action in Chinese application No. 201611237296.4 dated Mar. 26, 2019, 14 pages.
First Office Action in Chinese application No. 201611237293.0 dated Apr. 22, 2019, 14 pages.

* cited by examiner

1200

1202 — Obtaining a two dimensional (2D) image including a face and three dimensional (3D) data corresponding to the 2D image, wherein the 2D image includes a plurality of pixel point and the 3D data includes a plurality of spatial points 1204 — Determining at least one pixel point in the 2D image 1206 — Determining at least one spatial point in the 3D data corresponding to the at least one pixel point in the 2D image 1208 — Determining a projection matrix based on the at least one spatial point in the 3D data and a template 3D model of face 1210 — Determining a relationship between the 2D image and the 3D data based on the projection matrix 1212 — Determining, for each of the plurality of pixels in the 2D image, a spatial point in the 3D data corresponding to a pixel point in the 2D image based on the relationship between the 2D image and the 3D data

FIG. 12

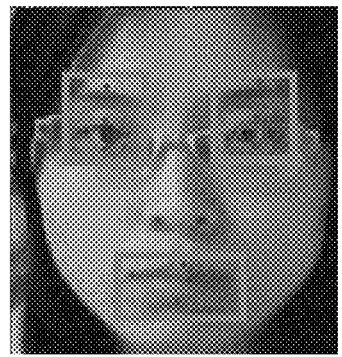
FIG. 18
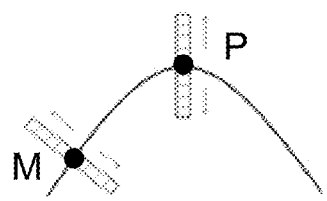
FIG. 19
FIG. 20

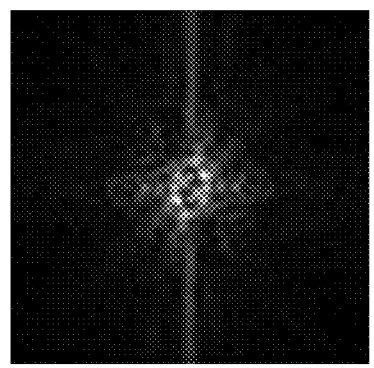
FIG. 21
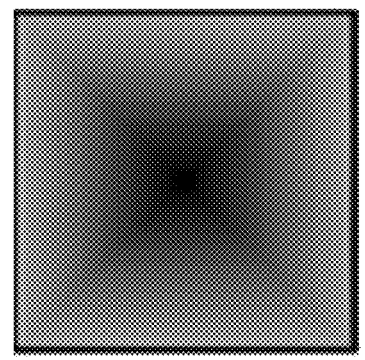
FIG. 22
| 0 | 0 | 0 | 0 | 0 | 0 | 0 | 0 |
|---|---|---|---|---|---|---|---|
| 0 | 2 | 2 | 2 | 2 | 2 | 2 | 0 |
| 0 | 2 | 1 | 1 | 1 | 1 | 2 | 0 |
| 0 | 2 | 1 | 0 | 0 | 1 | 2 | 0 |
| 0 | 2 | 1 | 0 | 0 | 1 | 2 | 0 |
| 0 | 2 | 1 | 1 | 1 | 1 | 2 | 0 |
| 0 | 2 | 2 | 2 | 2 | 2 | 2 | 0 |
| 0 | 0 | 0 | 0 | 0 | 0 | 0 | 0 |
FIG. 23

METHODS, SYSTEMS, AND MEDIA FOR EVALUATING IMAGES

CROSS-REFERENCE TO RELATED APPLICATIONS

This application is a continuation of International Application No. PCT/CN2017/118598, filed on Dec. 26, 2017, which claims priority to Chinese Application No. 201611237293.0 filed on Dec. 28, 2016, and Chinese Application No. 201611237296.4 filed on Dec. 28, 2016, the contents of which are incorporated herein by reference.

TECHNICAL FIELD

The present disclosure generally relates to methods, systems and media for image processing, and in particular, to methods, systems and media for evaluating images including a face.

BACKGROUND

Face recognition is an important topic in the field of pattern recognition, and is also a very active research field at present. It has broad application prospects in the fields of safety, commerce and economics, such as criminal investigation and detection, document verification, video surveillance, media entertainment, or the like. In a face recognition system, the quality of an image including a face may have a great influence on the accuracy of face recognition. An image with low quality may lead to errors or failures in the face recognition system. Therefore, it is desirable to evaluate the quality of the image, and further to correct the image or the face in the image if needed.

SUMMARY

According to a first aspect of the present disclosure, a face recognition electronic system may include one or more image obtaining units configured to obtain an image and one or more image processing units connected to the one or more image obtaining units. During operation, the one or more image processing units may be directed to perform one or more of the following operations. The one or more image processing units may obtain an image including a face. The one or more image processing units may determine at least one time domain feature related to the face in the image. The one or more image processing units may determine at least one frequency domain information related to the face in the image. The one or more image processing units may evaluate a quality of the image based on the at least one time domain feature and the frequency domain information.

In some embodiments, to evaluate the quality of the image, the one or more image processing units may determine whether the at least one time domain feature satisfies a condition. In response to a determination that the at least one time domain feature satisfies the condition, the one or more image processing units may evaluate the quality of the image based on the frequency domain information.

In some embodiments, the at least one time domain feature related to the face includes at least one of a posture of the face, or a definition of the face in the image.

In some embodiments, to determine the definition of the face in the image, the one or more image processing units may be directed to perform one or more of the following operations. The one or more image processing units may extract at least one landmark point in the image, the at least one landmark point being with respect to a region of interest of the face. The one or more image processing units may determine at least one neighboring point of the at least one landmark point. The one or more image processing units may determine, based on the at least one landmark point and the at least one neighboring point, a local variance related to the at least one landmark point, an average gradient related to the at least one landmark point, or an edge width related to the at least one landmark point in the image.

In some embodiments, to evaluate the quality of the image, the one or more image processing units may be directed to perform one or more of the following operations. The one or more image processing units may determine a value of a first parameter, the first parameter related to an average edge width of the at least one landmark point and a contrast ratio of the image. The one or more image processing units may determine a value of a second parameter, the second parameter related to the posture of the face. The one or more image processing units may determine a quality evaluation value of the image based on the value of the first parameter and the value of the second parameter.

In some embodiments, to determine the at least one time domain feature of the face, the one or more image processing units may determine a rotational angel of the face with respect to an axis.

In some embodiments, to determine the at least one time domain feature of the face, the one or more image processing units may determine a confidence value of the face, the confidence value indicating whether the face is occluded.

In some embodiments, to determine the at least one frequency domain information of the image, the one or more image processing units may be directed to perform one or more of the following operations. The one or more image processing units may perform a time-to-frequency-domain transformation on one or more pixel values of the image. The one or more image processing units may weight the time-to-frequency-domain transformed one or more pixel values of the image based on a weighting matrix. The one or more image processing units may determine the at least one frequency domain information of the image based on the weighted pixel values of the image.

According to another aspect of the present disclosure, a method implemented on at least one image processing electronic device may include one or more of the following operations. The method may include obtaining an image including a face. The method may include determining at least one time domain feature related to the face in the image. The method may include determining at least one frequency domain information related to the face in the image. The method may further include evaluating a quality of the image based on the at least one time domain feature and the frequency domain information.

According to yet another aspect of the present disclosure, a non-transitory computer readable medium may comprise at least one set of instructions. The at least one set of instructions may be executed by one or more image processing units. The one or more image processing units may obtain an image including a face. The one or more image processing units may determine at least one time domain feature related to the face in the image. The one or more image processing units may determine at least one frequency domain information related to the face in the image. The one or more image processing units may evaluate a quality of the image based on the at least one time domain feature and the frequency domain information.

According to yet another aspect of the present disclosure, a face recognition electronic system may include one or more image obtaining units configured to obtain an image and one or more image processing units connected to the one or more image obtaining units. During operation, the one or more image processing units may be directed to perform one or more of the following operations. The one or more image processing units may obtain a two-dimensional (2D) image including a face, and three-dimensional (3D) data corresponding to the 2D image, the 2D image including a plurality of pixels, the 3D data including a plurality of points. The one or more image processing units may determine, for each of the plurality of pixels in the 2D image, a point in the 3D data corresponding to the pixel in the 2D image. The one or more image processing units may determine a mask image based on the point in the 3D data corresponding to each of the plurality of pixels in the 2D image. The one or more image processing units may determine, based on the mask image, a symmetry related parameter of the face in the 2D image. The one or more image processing units may correct, based on the symmetry related parameter of the face, the 2D image to generate a corrected 2D image including a front view of the face.

In some embodiments, to determine, for each of the plurality of pixels in the 2D image, the point in the 3D data corresponding to the pixel in the 2D image, the one or more image processing units may be directed to perform one or more of the following operations. The one or more image processing units may determine at least one landmark point in the 2D image. The one or more image processing units may determine at least one point in the 3D data corresponding to the at least one landmark point in the 2D image. The one or more image processing units may determine a projection matrix based on the 3D data and a template 3D model of face. The one or more image processing units may determine a relationship between the 2D image and the 3D data based on the projection matrix. The one or more image processing units may determine, based on the relationship between the 2D image and the 3D data, at least one point in the 3D data corresponding to the at least one landmark point in the 2D image.

In some embodiments, to determine the symmetry related parameter of the face in the 2D image, the one or more image processing units may be directed to perform one or more of the following operations. The one or more image processing units may divide the mask image into a first sub-image and a second sub-image. The one or more image processing units may determine a difference between the first sub-image and the second sub-image. The one or more image processing units may determine, based on the difference between the first sub-image and the second sub-image, the symmetry related parameter of the face in the 2D image.

In some embodiments, to correct the 2D image, the one or more image processing units may be directed to perform one or more of the following operations. The one or more image processing units may determine a Gaussian image based on the mask image. The one or more image processing units may determine a first coefficient associated with the symmetry related parameter, the mask image, and the Gaussian image. The one or more image processing units may flip the Gaussian image and the 2D image. The one or more image processing units may determine a second coefficient associated with the symmetry related parameter, the mask image, and the flipped Gaussian image. The one or more image processing units may determine a first matrix based on the 2D image and the Gaussian image. The one or more image processing units may determine a second matrix based on the 2D image and the first coefficient. The one or more image processing units may determine a third matrix based on the flipped 2D image and the second coefficient. The one or more image processing units may correct the 2D image based on the first matrix, the second matrix, and the third matrix.

According to yet another aspect of the present disclosure, a method implemented on at least one device each of which has at least one processor and storage may include one or more of the following operations. The method may include obtaining a two-dimensional (2D) image including a face, and three-dimensional (3D) data corresponding to the 2D image, the 2D image including a plurality of pixels, the 3D data including a plurality of points. The method may include determining, for each of the plurality of pixels in the 2D image, a point in the 3D data corresponding to the pixel in the 2D image. The method may include determining a mask image based on the point in the 3D data corresponding to each of the plurality of pixels in the 2D image. The method may include determining, based on the mask image, a symmetry related parameter of the face in the 2D image. The method may further include correcting, based on the symmetry related parameter of the face, the 2D image to generate a corrected 2D image including a front view of the face.

According to yet another aspect of the present disclosure, a non-transitory computer readable medium may comprise at least one set of instructions. The at least one set of instructions may be executed by one or more image processing units. The one or more image processing units may obtain a two-dimensional (2D) image including a face, and three-dimensional (3D) data corresponding to the 2D image, the 2D image including a plurality of pixels, the 3D data including a plurality of points. The one or more image processing units may determine, for each of the plurality of pixels in the 2D image, a point in the 3D data corresponding to the pixel in the 2D image. The one or more image processing units may determine a mask image based on the point in the 3D data corresponding to each of the plurality of pixels in the 2D image. The one or more image processing units may determine, based on the mask image, a symmetry related parameter of the face in the 2D image. The one or more image processing units may correct, based on the symmetry related parameter of the face, the 2D image to generate a corrected 2D image including a front view of the face.

According to yet another aspect of the present disclosure, a system for face recognition may include an acquisition module configured to an image including a face. The system may also include an evaluation module configured to determine at least one time domain feature related to the face in the image, determine at least one frequency domain information related to the face in the image and evaluate the quality of the image based on the at least one time domain feature and the frequency domain information.

According to yet another aspect of the present disclosure, a system for correcting a 2D image may include an acquisition module configured to obtain the 2D image including a face, and 3D data corresponding to the 2D image, the 2D image including a plurality of pixels, the 3D data including a plurality of points. The system may further include a correction module configured to determine, for each of the plurality of pixels in the 2D image, a point in the 3D data corresponding to the pixel in the 2D image. The correction module may be further configured to determine a mask image based on the point in the 3D data corresponding to each of the plurality of pixels in the 2D image, and determine, based on the mask image, a symmetry related parameter of the face in the 2D image. The correction module may be further configured to correct, based on the symmetry related parameter of the face, the 2D image to generate a corrected 2D image including a front view of the face.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 12 is a flowchart illustrating an exemplary process for determining a spatial point in 3D data corresponding to a pixel in the 2D image according to some embodiments of the present disclosure;

FIG. 18 is a schematic diagram illustrating exemplary characteristic regions in an image including a face according to some embodiments of the present disclosure;

FIG. 19 is a schematic diagram illustrating an exemplary window covering eight neighboring points of a landmark point according to some embodiments of the present disclosure;

FIG. 20 is a schematic diagram illustrating an exemplary direction of a normal line of a landmark point in an image according to some embodiments of the present disclosure;

FIG. 21 is a schematic diagram illustrating an exemplary frequency domain information of an image including a face according to some embodiments of the present disclosure;

FIG. 22 is a schematic diagram illustrating an exemplary weighting matrix of frequency domain information of an image including a face according to some embodiments of the present disclosure;

FIG. 23 is a schematic diagram illustrating another exemplary weighting matrix of frequency domain information of an image including a face according to some embodiments of the present disclosure;

DETAILED DESCRIPTION

Figure 1:
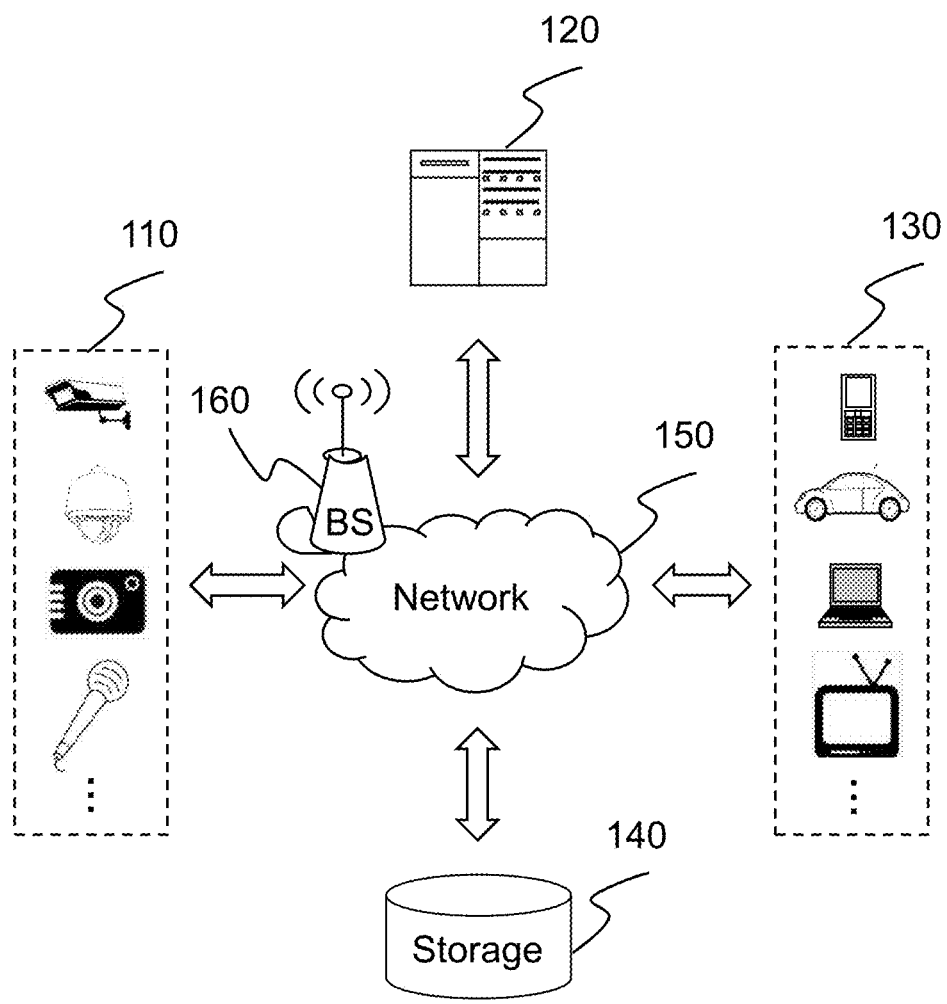
FIG. 1 is a schematic diagram of an exemplary image processing system according to some embodiments of the present disclosure.

In accordance with various implementations, as described in more detail below, mechanisms, which can include systems, methods, and media, for face image correction are provided.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure.

Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "module," "unit," "sub-unit," and/or "block" used herein are one method to distinguish different components, elements, parts, section or assembly of different levels in ascending order. However, the terms may be displaced by other expression if they may achieve the same purpose.

It will be understood that when a unit, module or block is referred to as being "on," "connected to" or "coupled to" another unit, module, or block, it may be directly on, connected or coupled to the other unit, module, or block, or intervening unit, module, or block may be present, unless the context clearly indicates otherwise. As used herein, the term "and/or" includes any and all combinations of one or more of the associated listed items.

The terminology used herein is for the purpose of describing particular example embodiments only and is not intended to be limiting. As used herein, the singular forms "a," "an" and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure.

The flowcharts used in the present disclosure illustrate operations that systems implement according to some embodiments of the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

An aspect of the present disclosure relates to systems and methods for correcting an image including a face. The systems and methods may include evaluating a quality of the image based on at least one time domain feature and frequency domain information related to the face in the image. Furthermore, the systems and methods may include determining a symmetry related parameter of the face which is associated with the posture of the face in the image. Additionally, the systems and method may include correcting the image to obtain a front-view face in the image.

FIG. 1 is a schematic diagram of an exemplary image processing system 100 according to some embodiments of the present disclosure. As illustrated in FIG. 1, the image processing system 100 may include an imaging device 110, an image processing device 120, a terminal 130, a storage 140, a network 150, a base station 160, and/or any other suitable component for processing images in accordance with various embodiments of the disclosure.

The imaging device 110 may generate an image including a specific object (e.g., a human face). The image may include a single frame that presents a static object, or a plurality of frames that present a moving object. The imaging device 110 may be any suitable device that is capable of generating an image. For example, the imaging device 110 may include a camera, a sensor, an image recorder, or the like, or a combination thereof. In some embodiments, the imaging device 110 may include a suitable type of camera, such as a fixed camera, a fixed dome camera, a covert camera, a Pan-Tilt-Zoom (PTZ) camera, a thermal camera, etc. In some embodiments, the imaging device 110 may include a suitable type of sensor, such as an audio sensor, a light sensor, a wind speed sensor, or the like, or a combination thereof.

The image(s) generated by the imaging device 110 may be stored in the storage 140, and/or sent to the image processing device 120, or the terminal 130 via the network 150.

The image processing device 120 may process an image generated by the imaging device 110 or retrieved from another component in the image processing system 100 (e.g., the storage 140, the terminal 130). The image processing device 120 may evaluate the quality of the image and/or correct the image. For example, the image processing device 120 may correct an image if the image is designated as unqualified. In some embodiments, the image processing device 120 may be integrated with the imaging device 110 to form an integrated component of the imaging processing system 100.

The image processing device 120 may also generate a control signal based on, for example, a feature of an object, an image of an object, a video of an object, or the like, or a combination. The control signal may be used to control the imaging device 110. For example, the image processing device 120 may generate a control signal to control the imaging device 110 (e.g., a camera) to track an object and obtain an image of the object.

The image processing device 120 may be any suitable device that is capable of evaluating the quality of the image and correcting the image. For example, the image processing device 120 may include a high-performance computer specialized in data processing, a personal computer, a portable device, a server, a microprocessor, an integrated chip, a digital signal processor (DSP), a tablet computer, a personal digital assistant (PDA), or the like, or a combination thereof. In some embodiments, the image processing device 120 may be implemented on an image processing device 200 shown in FIG. 2.

The terminal 130 may be connected to or communicate with the image processing device 120. The terminal 130 may allow one or more operators to control the production and/or display of the data (e.g., the image captured by the imaging device 110) on a display. The terminal 130 may include an input device, an output device, a control panel, a display (not shown in FIG. 1), or the like, or a combination thereof.

An input device may be a keyboard, a touch screen, a mouse, a remote controller, a wearable device, or the like, or a combination thereof. The input device may include alphanumeric and other keys that may be inputted via a keyboard, a touch screen (e.g., with haptics or tactile feedback), a speech input, an eye tracking input, a brain monitoring system, or any other comparable input mechanism. The input information received through the input device may be communicated to the image processing device 120 via the network 150 for further processing. Another type of the input device may include a cursor control device, such as a mouse, a trackball, or cursor direction keys to communicate direction information and command selections to, for example, the image processing device 120 and to control cursor movement on display or another display device.

A display may be configured to display the data received (e.g., the image captured by the imaging device 110). The data may include data before and/or after data processing, a request for input or parameter relating to video acquisition and/or processing, or the like, or a combination thereof. The display may include a liquid crystal display (LCD), a light emitting diode (LED)-based display, a flat panel display or curved screen (or television), a cathode ray tube (CRT), or the like, or a combination thereof.

The network 150 may facilitate communications between various components of the image processing system 100. The network 150 may be a single network, or a combination of various networks. The network 150 may be a wired network or a wireless network. The wired network may include using a Local Area Network (LAN), a Wide Area Network (WAN), a ZigBee, or the like, or a combination thereof. The wireless network may be a Bluetooth, a Near Field Communication (NFC), a wireless local area network (WLAN), Wi-Fi, a Wireless Wide Area Network (WWAN), or the like, or a combination thereof. The network 150 may also include various network access points, e.g., wired or wireless access points such as the base stations 160 or Internet exchange points through which a data source may connect to the network 150 to transmit data via the network 150.

The storage 140 may store data, image related information or parameters. The data may include an image (e.g., an image obtained by the imaging device 110), an audio signal, a video signal and/or communication data. The image related information may include a feature (e.g., pixel value) related to the object (e.g., face) in the image, frequency domain information of the image. More details regarding the image related information may be found in, for example, FIGS. 8-14 and the descriptions thereof. The image related parameter may include an intrinsic parameter (e.g., a focal length, a lens distortion parameter), and/or an extrinsic parameter (e.g., the pose of a camera, a position parameter of the camera) of the imaging device 110 (e.g., camera) that generates the image. Additionally, the image related parameter may include one or more parameters used to determine the quality of the image, e.g., as described in FIG. 10. Furthermore, the image related parameter may include a coefficient of one or more pixel matrixes for correcting the image, e.g., as described in FIG. 14.

It should be noted that the descriptions above of the image processing system 100 is provided for the purposes of illustration, and not intended to limit the scope of the present disclosure. For persons having ordinary skills in the art, various variations and modifications may be conducted under the guidance of the present disclosure. However, those variations and modifications do not depart the scope of the present disclosure. For example, part or all of the image data generated by the imaging device 110 may be processed by the terminal 130. In some embodiments, the imaging device 110, the image processing device 120 may be implemented in one single device configured to perform the functions of the imaging device 110 and the image processing device 120 described in this disclosure. In some embodiments, the terminal 130, and the storage 140 may be combined with the image processing device 120 as a single device. Similar modifications should fall within the scope of the present disclosure.

Figure 2:
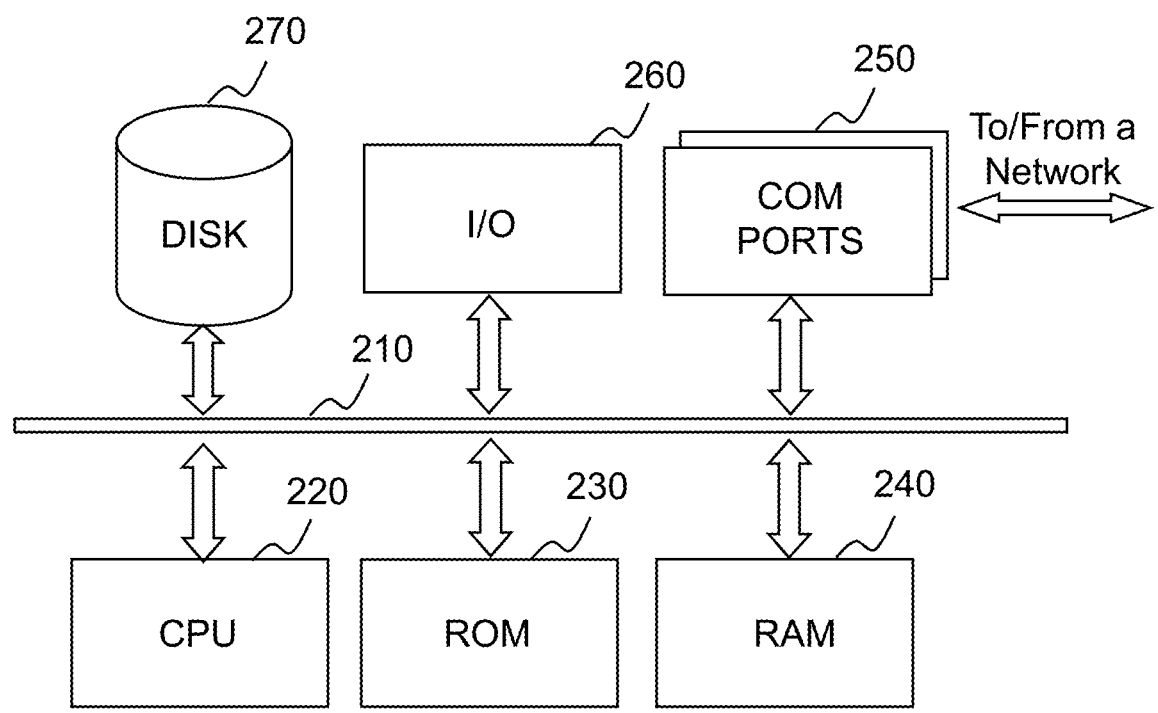
FIG. 2 is a schematic diagram illustrating an exemplary computing device according to some embodiments of the present disclosure.

FIG. 2 is a schematic diagram illustrating exemplary hardware and software components of an image processing device 200 on which the imaging device 110, the image processing device 120, and/or the terminal 130 may be implemented according to some embodiments of the present disclosure. For example, the image processing device 120 may be implemented on the image processing device 200 and configured to perform functions of the image processing device 120 disclosed in this disclosure.

The image processing device 200 may be a special-purpose computer, both of which may be used to implement a data transmission system for the present disclosure. The image processing device 200 may be used to implement any part of the data transmission as described herein. For example, the image processing device 120 may be implemented on the image processing device 200, via its hardware, software program, firmware, or a combination thereof. Although only one such computer is shown, for convenience, the computer functions relating to the image processing as described herein may be implemented in a distributed fashion on a number of similar platforms, to distribute the processing load.

The image processing device 200, for example, may include COM ports 250 connected to and from a network connected thereto to facilitate data communications. The image processing device 200 may also include a central processing unit (CPU) 220, in the form of one or more processors, for executing program instructions. The exemplary computer platform may include an internal communication bus 210, a program storage and data storage of different forms, such as, a disk 270, and a read only memory (ROM) 230, or a random access memory (RAM) 240, for various data files to be processed and/or transmitted by the computer. The exemplary computer platform may also include program instructions stored in the ROM 230, RAM 240, and/or any other type of non-transitory storage medium to be executed by the CPU 220. The methods and/or processes of the present disclosure may be implemented as the program instructions. The image processing device 200 also includes an I/O component 260, supporting input/output between the computer and other components therein. The image processing device 200 may also receive programming and data via network communications.

Merely for illustration, only one CPU and/or processor is illustrated in the image processing device 200. However, it should be noted that the image processing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, if in the present disclosure the CPU and/or processor of the image processing device 200 executes both step A and step B, it should be understood that step A and step B may also be performed by two different CPUs and/or processors jointly or separately in the image processing device 200 (e.g., the first processor executes step A and the second processor executes step B, or the first and second processors jointly execute steps A and B).

Figure 3:
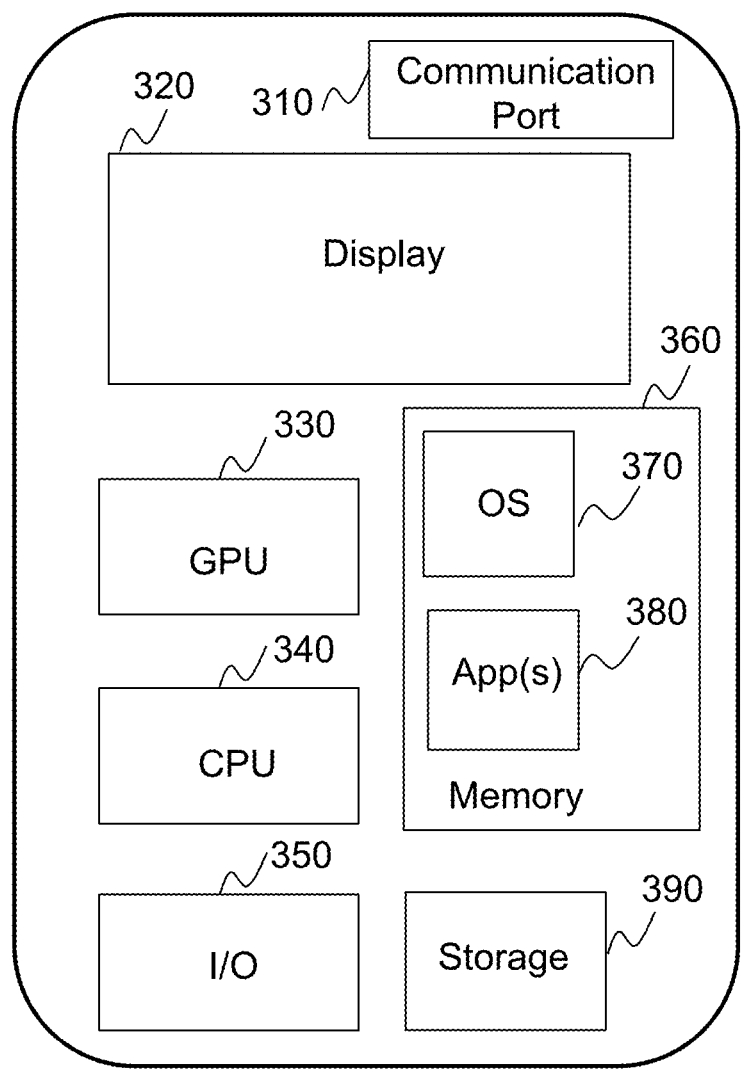
FIG. 3 is a schematic diagram illustrating exemplary hardware and/or software components of an exemplary mobile device on which the terminal may be implemented according to some embodiments of the present disclosure.

FIG. 3 is a schematic diagram illustrating exemplary hardware and/or software components of an exemplary device 300 on which the terminal 130 may be implemented according to some embodiments of the present disclosure. The device 300 may be a mobile device or may be a device fixed in certain position. As illustrated in FIG. 3, the device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the device 300. In some embodiments, a mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for receiving and rendering information relating to transmitting data in a video signal or other information from, for example, the image processing device 120. User interactions with the information stream may be achieved via the I/O 350 and provided to the image processing device 120 and/or other components of the image processing system 100 via the network 150.

Figure 4:
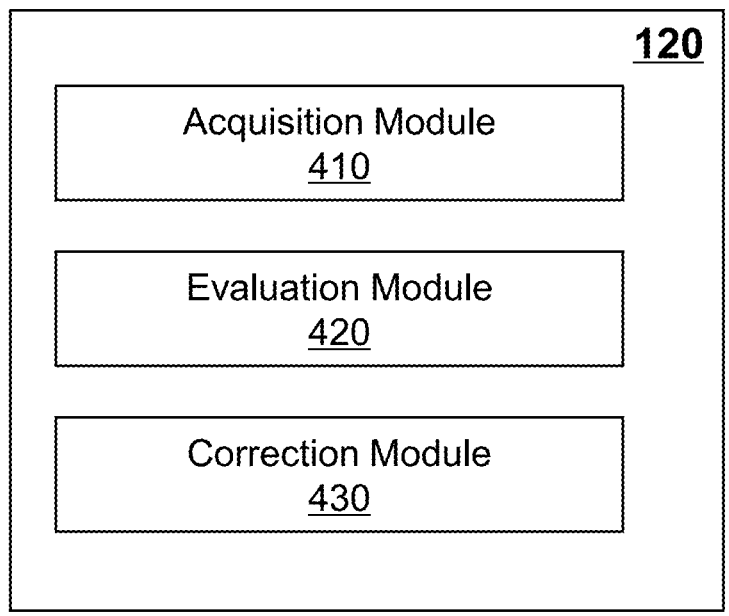
FIG. 4 is a block diagram illustrating an exemplary image processing device according to some embodiments of the present disclosure.

FIG. 4 is a block diagram illustrating an exemplary image processing device 120 according to some embodiments of the present disclosure. The image processing device 120 may include an acquisition module 410, an evaluation module 420, and a correction module 430.

The acquisition module 410 may obtain an image including a face. In some embodiments, the image may be a two-dimensional (2D) image or a three-dimensional (3D) image.

The evaluation module 420 may evaluate the quality of an image acquired by the acquisition module 410. In some embodiments, the evaluation module 420 may determine whether the image is qualified according to a confidence value of the object (e.g., a face) in the image. The confidence value may indicate the credibility of the object in an image when the evaluation module 420 evaluates the image. The confidence value may be in association with a condition of the object, e.g., whether the object is occluded. Alternatively or additionally, the evaluation module 420 may determine whether the image is qualified according to a feature of the object (e.g., a face) in the image. Exemplary feature of the object may include the posture of the object, the definition of the object, or the like, or a combination thereof. As used herein, the definition of the object may indicate the level of clarity of the object in the image. A larger definition of the object may correspond to a higher level of clarity of the object. The posture of the object may represent the position of the object or a rotational angle of the object with respect to a specific direction.

The correction module 430 may correct an image (e.g., a 2D image, a 3D image). In some embodiments, the correction module 430 may correct an image including an object (e.g., a face) to change one or more features (e.g., the posture, the definition) of the object. For example, the correction module 430 may adjust the posture of the object presented in the image.

The modules in the image processing device 120 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. In some embodiments, the image processing device 120 may include a storage module used to store information and/or data associated with the image to be processed.

Figure 5:
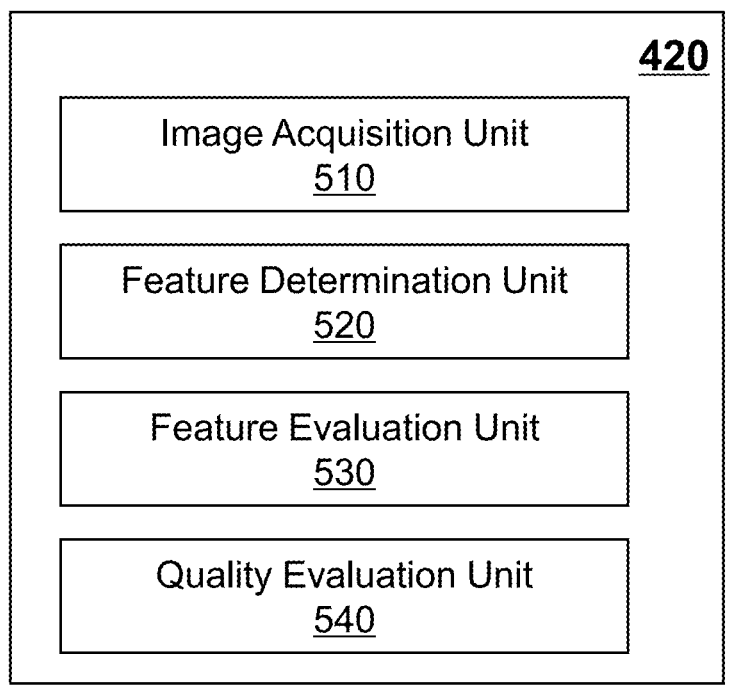
FIG. 5 is a block diagram illustrating an exemplary evaluation module according to some embodiments of the present disclosure.

FIG. 5 is a block diagram illustrating an exemplary evaluation module 420 according to some embodiments of the present disclosure. The evaluation module 420 may include an image acquisition unit 510, a feature determination unit 520, a feature evaluation unit 530, and a quality evaluation unit 540.

The image acquisition unit 510 may obtain an image. In some embodiments, the image may include a 2D image and/or a 3D image.

The feature determination unit 520 may determine one or more features related to an object in an image acquired from, for example, the image acquisition unit 510. In some embodiments, the image may include a human face, an animal face, and/or any other objects that is suitable for image recognition. In the following description, the present disclosure takes a human face as an example to illustrate the systems and methods thereof. The one or more features related to the face may include at least one of the posture of the face, the definition of the face, and/or a confidence value of the face indicating whether the face is occluded.

The feature evaluation unit 530 may evaluate a feature related to an object (e.g., a face) in an image. In some embodiments, the feature evaluation unit 530 may evaluate whether a feature related to the object in the image satisfies a condition. For example, the feature evaluation unit 530 may determine whether the posture of the object in the image satisfies a first condition. As another example, the feature evaluation unit 530 may determine whether the definition of the object in the image satisfies a second condition. As still another example, the feature evaluation unit 530 may determine whether a confidence value of the object satisfies a third condition. The first condition, the second condition and the third condition may be described elsewhere (e.g., the process 900 in FIG. 9 and the description thereof) in the present disclosure.

The quality evaluation unit 540 may determine whether the quality of an image is qualified. In some embodiments, the quality evaluation unit 540 may perform the determination according to one or more features determined by the feature determination unit 520 or evaluated by the feature evaluation unit 530. In some embodiments, the quality evaluation unit 540 may perform the determination associated with the image according to the frequency domain information of the image. More descriptions for determining the quality of the image may be described elsewhere (e.g., the process 1000 in FIG. 10 and the description thereof) in the present disclosure.

The units in the evaluation module 420 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. In some embodiments, the evaluation module 420 may include a storage unit (not shown) used to store information and/or data associated with the image to be evaluated.

Figure 6:
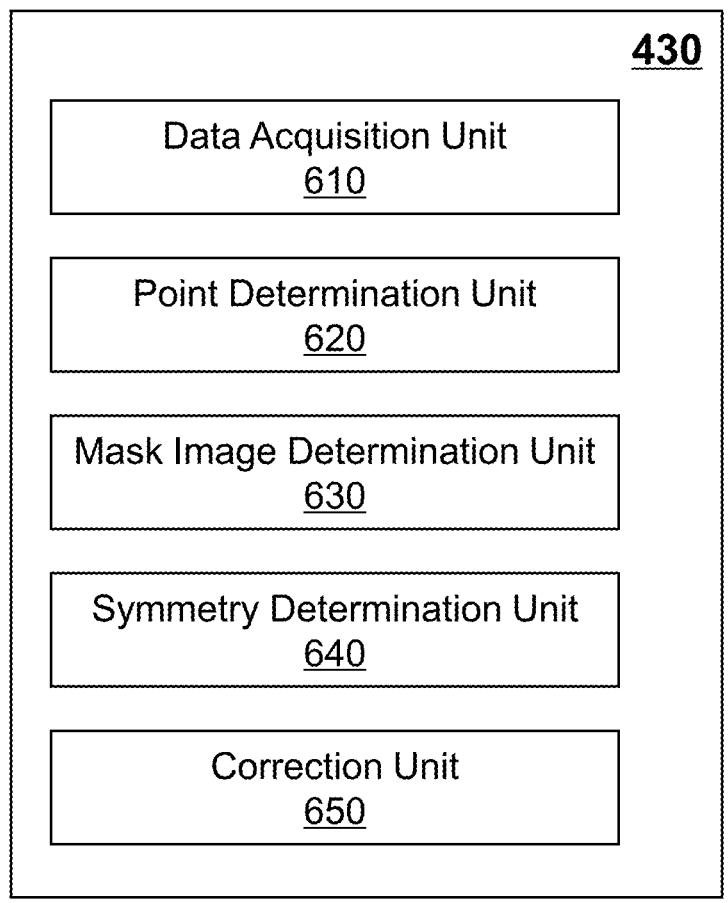
FIG. 6 is a block diagram illustrating an exemplary correction module according to some embodiments of the present disclosure.

FIG. 6 is a block diagram illustrating an exemplary correction module 430 according to some embodiments of the present disclosure. The correction module 430 may include a data acquisition unit 610, a point determination unit 620, a mask image determination unit 630, a symmetry determination unit 640, and a correction unit 650.

The data acquisition unit 610 may obtain a 2D image and 3D data corresponding to the 2D image. In some embodiments, the 2D image and the 3D data may include a same object (e.g., a face). The 3D data may be presented in the form of a 3D image, a 3D model, or the like, or a combination thereof.

The point determination unit 620 may determine the relationship between a point (e.g., a pixel) in a 2D image and a spatial point in 3D data corresponding to the 2D image. More descriptions for determining a spatial point in the 3D data corresponding to a pixel in the 2D image may be found elsewhere (e.g., the process 1000 in FIG. 10 and the description thereof) of the present disclosure.

The mask image determination unit 630 may determine a mask image based on a 2D image and 3D data corresponding to the 2D image.

The symmetry determination unit 640 may determine the symmetry of an object (e.g., a face) in an image. The symmetry determination unit 640 may determine the symmetry of the object based on the difference between a half portion of the image and the other half portion of the image. More descriptions for determining the symmetry of a face in an image may be found elsewhere (e.g., the process 1300 in FIG. 13 and the description thereof) in the present disclosure.

The correction unit 650 may correct an image. In some embodiments, the correction unit 650 may correct the image based on the symmetry of an object in the image determined by, for example, the symmetry determination unit 640. More descriptions for correcting a 2D image may be found elsewhere (e.g., the process 1400 in FIG. 14 and the description thereof) in the present disclosure.

The units in the correction module 430 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. In some embodiments, the correction module 430 may include a storage unit (not shown) used to store an image to be corrected.

Figure 7:
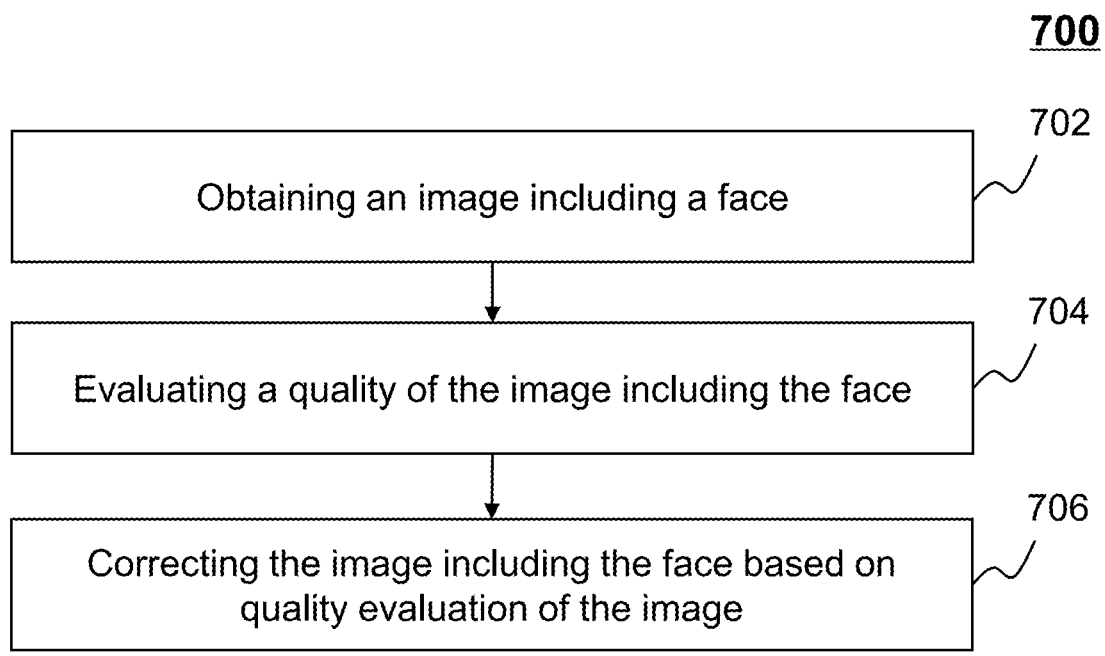
FIG. 7 is a flowchart illustrating an exemplary process for correcting an image including a face according to some embodiments of the present disclosure.

FIG. 7 is a flowchart illustrating an exemplary process 700 for correcting an image including a face according some embodiments of the present disclosure. The process 700 may be implemented as a set of instructions (e.g., an application) stored in the storage ROM 230, RAM 240 or hardware and/or software components of the device 300. The processor 220 and/or the device 300 may execute the set of instructions, and when executing the instructions, it may be configured to perform the process 700. The operations of the illustrated process presented below are intended to be illustrative. In some embodiments, the process 700 may be accomplished with one or more additional operations not described and/or without one or more of the operations discussed. Additionally, the order in which the operations of the process as illustrated in FIG. 7 and described below is not intended to be limiting.

In 702, the image processing device 120 (e.g., the acquisition module 410) may obtain an image including a face. In some embodiments, the image including a face may include a 2D image and/or a 3D image.

In 704, the image processing device 120 (e.g., the evaluation module 420) may evaluate the image. In some embodiments, the evaluation module 420 may evaluate the image based on at least one feature related to the face in the image such as to generate a result indicating the quality of the image (e.g., indicating whether the image is qualified). For example, the image may be regarded as qualified if the at least one feature related to the face in the image satisfies a certain condition. The at least one feature related to the face in the image may include at least one of the posture of the face, the definition of the face, and/or a confidence value of the face indicating whether the face is occluded, or the like, or any combination thereof. More descriptions regarding the feature(s) related to the face may be found elsewhere (e.g., in FIG. 8 and the description thereof) in the disclosure.

In some embodiments, the operation 704 may include different stages of evaluation. For example, the first stage may include evaluating the image based on at least one time domain feature related to the face. The second stage may include evaluating the image based on the frequency domain information related to the face. It shall be noted that the different stages of evaluation may be performed sequentially or concurrently. In a sequential order of performing the stages of evaluation, the sequence of different stages of evaluation may be altered. For example, the evaluation of the image based on at least one time domain feature related to the face may be performed prior to or after the evaluation of the image based on frequency domain information related to the face. As used herein, the time domain feature related to the face may indicate the feature of the face presented in the image at a time spot or during a time interval.

In 706, the image processing device 120 (e.g., the correction module 430) may correct the image based on the quality of the image. In some embodiments, if the image is unqualified (e.g., the at least on feature related to the face in the image does not satisfy the certain condition), the correction module 430 may correct the image by correcting one or more features of the face. For example, the correction module 430 may adjust the posture of the face presented in the image. More descriptions of image correction may be found elsewhere (e.g., in FIGS. 11-14 and the descriptions thereof) in the present disclosure.

Figure 8:
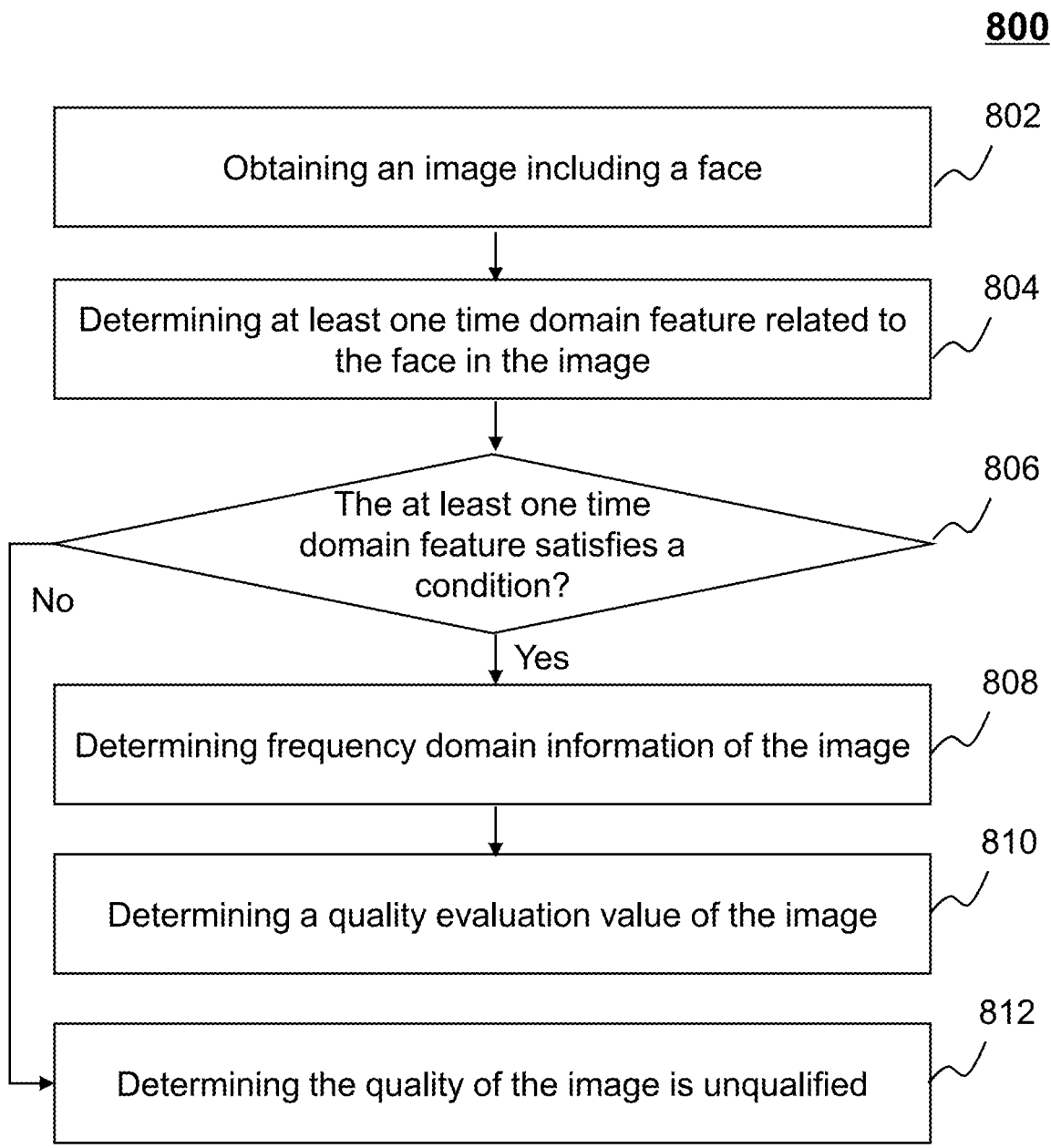
FIG. 8 is a flowchart illustrating an exemplary process for evaluating the quality of an image including a face according to some embodiments of the present disclosure.

FIG. 8 is a flowchart illustrating an exemplary process 800 for evaluating quality of an image including a face according to some embodiments of the present disclosure. The process 800 may be implemented as a set of instructions (e.g., an application) stored in the storage ROM 230, RAM 240 or hardware and/or software components of a device 300. The processor 220 and/or the device 300 may execute the set of instructions, and when executing the instructions, it may be configured to perform the process 800. The operations of the illustrated process presented below are intended to be illustrative. In some embodiments, the process 800 may be accomplished with one or more additional operations not described and/or without one or more of the operations discussed. Additionally, the order in which the operations of the process as illustrated in FIG. 8 and described below is not intended to be limiting. In some embodiments, the process 800 may be performed in connection with the operation 704.

In 802, the evaluation module 420 (e.g., the information acquisition unit 510) may acquire an image including a face.

In 804, the evaluation module 420 (e.g., the feature determination unit 520) may determine at least one time domain feature related to the face in the image. Exemplary time domain features related to the face may include the posture of the face, the definition of the face, and/or a confidence value of the face indicating whether the face is occluded, or the like, or a combination thereof.

Figure 15:
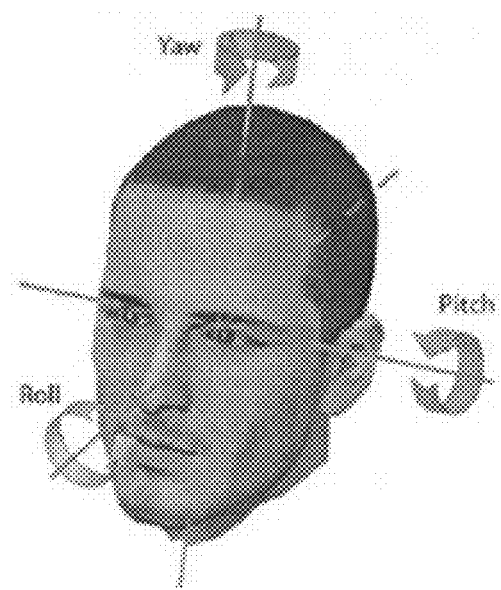
FIG. 15 is a schematic diagram illustrating an exemplary posture of a 3D face according to some embodiments of the present disclosure.

In some embodiments, the posture of the face may represent the position of the face or a rotational angle of the face with respect to a specific axis. The rotational angle of the face may include a deflection angle of the face with respect to axis YAW (also referred to as Sa_yaw) as illustrated in FIG. 15, a pitch angle of the face with respect to axis PITCH (also referred to as Sa_pitch) as illustrated in FIG. 15, or a tilt angle of the face with respect to an axis ROLL (also referred to as Sa_roll) as illustrated in FIG. 15. As used herein, the rotational angle of the face may refer to the angle with respect to a reference position of the face, e.g., the front-view face.

In some embodiments, the definition of the face may represent the level of clarity of the face in the image. To determine the definition of the face, the evaluation module 420 (e.g., the feature determination unit 520) may extract at least one landmark point of the face. As used herein, a landmark point may be a characteristic point that belongs to or represents a specific region of the face in the image.

Figure 16:
FIG. 16 is a schematic diagram illustrating exemplary landmark points in an image including a face according to some embodiments of the present disclosure.

Exemplary landmark points of the face may include an edge point of a facial feature (e.g., a mouth corner point, an eye corner point) of the face. For illustration purpose, the landmark point(s) of the face may be extracted from the image based on a face landmark point localization algorithm. As shown in FIG. 16, the evaluation module 420 (e.g., the feature determination unit 520) may select 14 landmark points labelled with consecutive numerals 0, 1, 2, . . . , 13. The 14 landmark points may include points at the upper edge of the eyebrow center (e.g., the landmark points 0 and 5), boundary points of the right eye (e.g., the landmark points 1 and 3), an upper edge point of the right eye (e.g., the landmark point 2), a lower edge points of the right eye (e.g., the landmark point 4)), boundary points of the left eye (e.g., the landmark points 6 and 8), an upper edge points of the left eye (e.g., the landmark point 7), an lower edge points of the left eye (e.g., the landmark point 9)), boundary points of the mouth (e.g., the landmark points 10 and 12), and upper/lower edge point of the mouth (e.g., the landmark points 11/13)). In some embodiments, in order to extract the landmark points, the size of the image may be adjusted to a uniform size (e.g., 120 pixel*120 pixel), and thus, corresponding positions of the landmark point may be determined in the adjusted image.

The evaluation module 420 (e.g., the feature determination unit 520) may determine at least one neighboring point around a landmark point. Then, based on the landmark points and the at least one neighboring point around each landmark point, the evaluation module 420 (e.g., the feature determination unit 520) may determine a parameter related to the definition of the face in the image, e.g., the local variance related to the landmark points, an average gradient related to the landmark points, and/or an edge width related to the landmark points.

Figure 17:
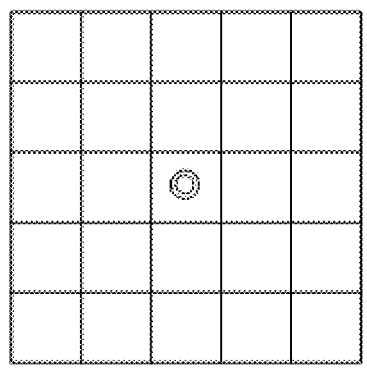
FIG. 17 is a schematic diagram illustrating an exemplary 5*5 neighboring region of a landmark point according to some embodiments of the present disclosure.

As used herein, the local variance may be a statistical variance of the pixel values of pixel points in a neighboring region around the landmark point. The neighboring region may have the shape of a triangle, a circle, or a quadrilateral, or the like. In some embodiments, the neighboring region may be a 5 pixel*5 pixel region as shown in FIG. 17. In FIG. 17, the circle "⊙" represents the landmark point (e.g., one of the 14 landmark points shown in FIG. 16). Each grid around the landmark point represents a pixel in the neighboring region of the landmark point. For each landmark point, the evaluation module 420 (e.g., the feature determination unit 520) may determine a local variance based on the pixel value of the landmark point and the pixel values of the pixel points in the neighboring region.

The average gradient may be a gradient statistics of the pixel values of pixel points in a characteristic region. The characteristic region may be a specific region including at least one region of interest (ROI) on the face. For example, the characteristic region may be a region enclosing all or a portion of the 14 landmark points illustrated in FIG. 16. As another example, the characteristic region may include a right eye region, a left eye region, and a mouth region as shown in FIG. 18. In FIG. 18, the right eye region may be represented by a first circumscribed rectangle enclosing the landmark points 0 to 4. The left eye region may be represented by a second circumscribed rectangle enclosing the landmark points 5 to 9. The mouth region may be represented by a third circumscribed rectangle enclosing the landmark points 10 to 13. The evaluation module 420 (e.g., the feature determination unit 520) may determine the average gradient based on the pixel values of the points in the first characteristic region, second characteristic region, and/or third characteristic region.

For illustration purpose, to determine an average gradient of a characteristic region, the evaluation module 420 (e.g., the feature determination unit 520) may identify all pixel points in the characteristic region. For each of the pixel points in the characteristic region, the evaluation module 420 may determine a weighted gradient matrix.

To determine a weighted gradient matrix for a pixel point, the evaluation module 420 (e.g., the feature determination unit 520) may determine a local region for each of the pixel points in the characteristic region. Taking a pixel point "⊙" shown in FIG. 19 as an example, the evaluation module 420 may determine a 3 pixel*3 pixel window as the local region of the pixel point "⊙". The 3 pixel*3 pixel window covers eight neighboring pixel points around the pixel point "⊙". In the local region, the distance from each corner pixel point (e.g., represented by "✗") to the pixel point "⊙" is $\sqrt{2}$, and the distance from each adjacent pixel point (e.g., represented by "+") to the pixel point "⊙" is 1. Thus, a weighting matrix W may be represented by:

$$W = \begin{bmatrix} 1/\sqrt{2} & 1 & 1/\sqrt{2} \\ 1 & 0 & 1 \\ 1/\sqrt{2} & 0 & 1/\sqrt{2} \end{bmatrix}. \tag{1}$$

Then, the evaluation module 420 (e.g., the feature determination unit 520) may determine a local gradient matrix by subtracting the pixel value of the pixel point "⊙" by the pixel value of each other pixel point in the local region. Further, the evaluation module 420 (e.g., the feature determination unit 520) may determine the weighted gradient matrix of a pixel point by weighting the local gradient matrix by the weighting matrix, e.g., by multiplying the value in the local gradient matrix with a corresponding value in the weighting matrix.

The values in the weighted gradient matrix may be referred to as gradient values. For each weighted gradient matrix corresponding to a pixel point in the characteristic region, the evaluation module 420 (e.g., the feature determination unit 520) may identify the gradient values which are greater than a specific threshold (e.g., 2) as target gradient values. For each weighted gradient matrix, the number of the target values may be expressed as N, the sum of all target values may be expressed as S. Additionally, the evaluation module 420 (e.g., the feature determination unit 520) may identify the maximum gradient value in the vertical direction (e.g., the values in the second column line) in the weighted gradient matrix corresponding to a pixel point in the characteristic region.

Next, the evaluation module 420 (e.g., the feature determination unit 520) may determine the average gradient of a characteristic region according to formula (2) below:

$$AVG_{nmg} = \frac{S}{N} * MAX_G / AVG_{gry}, \quad (2)$$

where $AVG_{nmg}$ refers to the average gradient of the characteristic region, $AVG_{gry}$ refers to an average gray value of the characteristic region, $MAX_G$ refers to the maximum gradient value in the vertical direction among all weighted gradient matrixes.

As used herein, the edge width related to a landmark point may be represented by the number of translation pixel points associated with the landmark point. The evaluation module 420 (e.g., the feature determination unit 520) may determine the translation pixel points by moving the landmark point along a certain direction by one pixel point at a time. The certain direction may be along a normal line of a curve at the landmark point. For illustration purpose, taking the landmark points M and P in FIG. 20 as examples, the evaluation module 420 (e.g., the feature determination unit 520) may determine a curve (also referred to as "edge curve") that passes through the landmark points M and P. Then, the evaluation module 420 (e.g., the feature determination unit 520) may determine the normal lines (e.g., the direction represented by arrows in FIG. 20) at the landmark point P and M, respectively. Then, the evaluation module 420 (e.g., the feature determination unit 520) may move the landmark point along opposite directions (e.g., the direction represented by arrows in FIG. 20) of the normal line by one pixel point at a time until a stopping condition is satisfied.

In some embodiments, the stopping condition may depend on the pixel value of the translation pixel point. For example, if the difference between the pixel value of the translation pixel point and the pixel value of the landmark point is greater than a gray difference threshold, the translation of the landmark point may be terminated. The numbers of translation pixel points on both sides of the curve may be counted, respectively. As such, the edge width related to the landmark point may be determined according to formula (3) below:

$$EW = EW1 + EW2 \quad (3)$$

where EW refers to the edge width related to the landmark point, EW1 and EW2 refer to the numbers of translation pixel points on both sides of the curve, respectively.

The gray difference threshold may be determined according to a contrast ratio of the characteristic region (e.g., the right eye region, the left eye region, and/or the mouth region as illustrated in FIG. 18) where the landmark point is located. For example, the evaluation module 420 (e.g., the feature determination unit 520) may determine the contrast ratio of the characteristic region according to formulae (4) to (6) below:

$$FC = \frac{\sqrt{\delta_2}}{256 \times \sqrt[4]{\mu_4 / \delta_2^2}} \quad (4)$$

$$\mu_4 = \frac{\sum_{i=0}^{255} (i - avg)^4 h(i)}{\sum_{i=0}^{255} h(i)} \quad (5)$$

$$\delta_2 = \frac{\sum_{i=0}^{255} (i - avg)^2 h(i)}{\sum_{i=0}^{255} h(i)} \quad (6)$$

where FC refers to the contrast ratio of the characteristic region, avg refers to the average gray value of the characteristic region, and h(i) refers to the number of pixel points of which the gray value is i in the characteristic region.

Based on the contrast ratio of the characteristic region as described above, the evaluation module 420 (e.g., the feature determination unit 520) may determine the gray difference threshold of the characteristic region according to formula (7) below:

$$TH = 3 + 20 \times FC \quad (7)$$

where TH refers to the gray difference threshold of the characteristic region where the landmark point is located.

In some embodiments, to determine the confidence value of the face indicating whether the face is occluded, the evaluation module 420 (e.g., the feature determination unit 520) may perform statistic analysis on a number of images including occluded faces and images including nonoccluded faces in advance. The statistic analysis may be performed according to Local Binary Pattern (LBP) patterns associated with a method of Support Vector Machine (SVM) based on a confidence value, and/or the LBP patterns associated with SVM classification method based on a confidence value. Then, the evaluation module 420 may determine a confidence value of the face which may reflect whether the face in the image is occluded.

In 806, the evaluation module 420 (e.g., the feature evaluation unit 530) may determine whether the at least one time domain feature related to the face satisfies a condition. In some embodiments, the evaluation module 420 (e.g., the feature evaluation unit 530) may determine whether the posture of the face in the image satisfies a first condition. In some embodiments, the evaluation module 420 (e.g., the feature evaluation unit 530) may determine whether the definition of the face in the image satisfies a second condition. In some embodiments, the evaluation module 420 (e.g., the feature evaluation unit 530) may determine whether the confidence value of the face satisfies a third condition. More descriptions of different conditions with respect to different time domain features may be found elsewhere (e.g., the process 900 in FIG. 9 and the description thereof) in the present disclosure.

If the at least one time domain feature does not satisfy the condition, the process 800 may proceed to 812. In 812, the evaluation module 420 (e.g., the quality evaluation unit 540) may determine that the quality of the image is unqualified. If the at least one time domain feature satisfies the condition, the process 800 may proceed to 808.

In 808, the evaluation module 420 (e.g., the quality evaluation unit 540) may determine frequency domain information of the image. The frequency domain information of the image may also relate to the definition of the face in the image.

To determine the frequency domain information, the evaluation module 420 (e.g., the quality evaluation unit 540) may perform a time-to-frequency domain transformation on one or more pixel values of the image. For example, the evaluation module 420 (e.g., the quality evaluation unit 540) may adjust the size of the image to a certain size (e.g., 64 pixel*64 pixel), and perform the Fourier transformation on the one or more pixel values of the adjusted image. Additionally, the evaluation module 420 (e.g., the quality evaluation unit 540) may perform a weighted operation on the Fourier transformed image based on a weighting matrix. Thus, the evaluation module 420 may determine the frequency domain information of the image by, e.g., adding up all weighted pixel values of the Fourier transformed image.

The weighting matrix may be a matrix. For illustration purpose, in FIG. 22, the gray picture represents a weighting matrix. Each pixel in the gray picture may represent a matrix element. The matrix elements of the weighting matrix, which are represented by the gray values of the corresponding pixels, may increase from the center to peripheries, but with pixel values at the edge set to 0. Alternatively, the specific values of the weighting matrix may be presented in the form of numerals as shown in FIG. 23. Alternatively or additionally, before performing the Fourier transformation on the image, the evaluation module 420 (e.g., the quality evaluation unit 540) may adjust one or more pixel values of the time domain image to obtain another time domain image such that the high-frequency component of the frequency domain information may be concentrated in the central region.

In 810, the evaluation module 420 (e.g., the quality evaluation unit 540) may determine a quality evaluation value of the image. In some embodiments, the evaluation module 420 (e.g., the quality evaluation unit 540) may determine the quality evaluation value based on one or more features of the image (e.g., the posture of the face in the image, the definition of the face in the image). The quality evaluation value may be used in a subsequent operation on the image, e.g., operation 706 as illustrated in FIG. 7. More descriptions of determining the quality evaluation value of the image may be found elsewhere (e.g., the process 1000 in FIG. 10 and the description thereof) in the present disclosure.

It should be noted that the above description for evaluating the quality of the image including a face is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the operations 808 and 810 may be combined into one operation.

Figure 9:
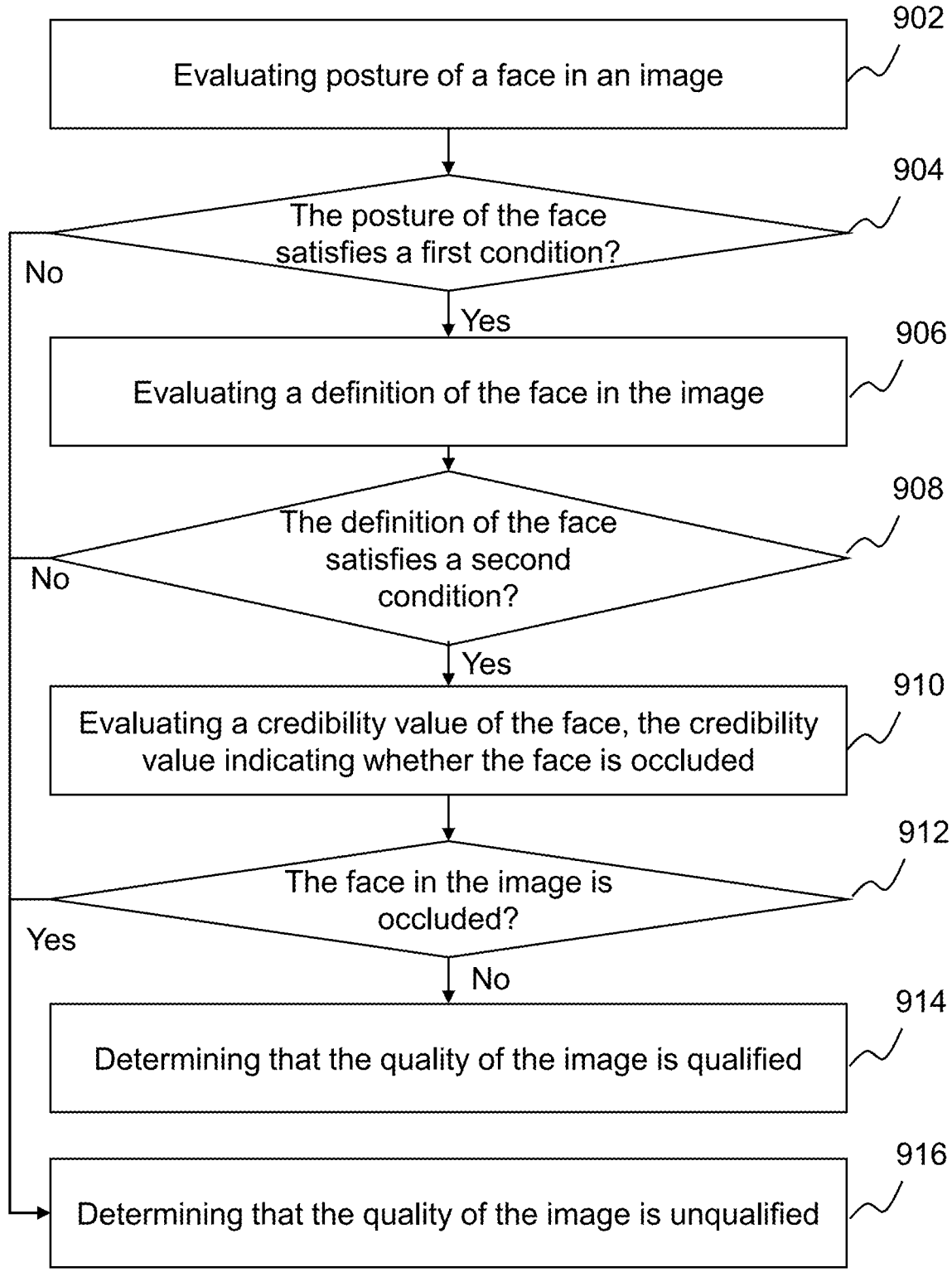
FIG. 9 is a flowchart illustrating an exemplary process for determining whether the quality of an image including a face is qualified according to some embodiments of the present disclosure.

FIG. 9 is a flowchart illustrating an exemplary process 900 for determining whether the quality of an image including a face is qualified according to some embodiments of the present disclosure. The process 900 may be implemented as a set of instructions (e.g., an application) stored in the storage ROM 230, RAM 240 or hardware and/or software components of a device 300. The processor 220 and/or the device 300 may execute the set of instructions, and when executing the instructions, it may be configured to perform the process 900. The operations of the illustrated process presented below are intended to be illustrative. In some embodiments, the process 900 may be accomplished with one or more additional operations not described and/or without one or more of the operations discussed. Additionally, the order in which the operations of the process as illustrated in FIG. 9 and described below is not intended to be limiting.

In 902, the evaluation module 420 (e.g., the feature evaluation unit 530) may evaluate the posture of a face in an image. In some embodiments, the posture of the face in the image may be represented by a rotational angle of the face with respect to an axis. For example, in FIG. 15, the posture of the face may be represented by three rotational angles, i.e., the deflection angle Sa_yaw with respect to the YAW axis, the pitch angle Sa_pitch with respect to the PITCH axis, and the tilt angle Sa_roll with respect to the ROLL axis. As shown, the YAW axis points from bottom to top, the PITCH axis points from left to right, and the ROLL axil points from back to front of the image plane.

To evaluate the posture of the face, the evaluation module 420 (e.g., the feature evaluation unit 530) may determine whether the rotational angle with respect to a specific axis is greater than an angle threshold associated with the specific axis (e.g., the YAW angle threshold associated with the YAW axis, the PITCH angle threshold associated with the PITCH axis, and/or the ROLL angle threshold associated with the ROLL axis). The angle threshold may be a default value stored in a storage device (e.g., the storage device 140) or a value set by a user of the image processing device 120.

In 904, the evaluation module 420 (e.g., the feature evaluation unit 530) may determine whether the posture of the face satisfies a first condition. In some embodiments, the first condition may depend on the rotational angle with respect to a specific axis. For example, the first condition may include that the deflection angle Sa_yaw with respect to the YAW axis is less than the YAW angle threshold. As another example, the first condition may be that the deflection angle Sa_yaw is less than the YAW angle threshold and the pitch angle Sa_pitch is less than the PITCH angle threshold as well. If the posture of the face satisfies the first condition, the process 900 may proceed to 906. If the posture of the face does not satisfy the first condition, the process 900 may proceed to 916. In 916, the evaluation module 420 (e.g., the feature evaluation unit 530) may determine that the quality of the image is unqualified in which condition the image processing device 120 may stop processing the image.

In 906, the evaluation module 420 (e.g., the feature evaluation unit 530) may evaluate the definition of the face in the image. As described in connection with operation 804, the evaluation module 420 (e.g., the feature evaluation unit 530) may determine a parameter related to the definition of the face in the image, e.g., the local variance related to the landmark points in the image, the average gradient related to the landmark points in the image, and/or the edge width related to the landmark points in the image.

To evaluate the definition of the face, the evaluation module 420 (e.g., the feature evaluation unit 530) may determine whether the value of the parameter related to the definition of the face is greater than a definition threshold. Merely by way of example, the definition threshold may include a local variance threshold, a gradient threshold, an edge width threshold, or the like, or a combination thereof. The definition threshold may be a default parameter stored in a storage device (e.g., the storage device 140) or a parameter set by a user of the image processing device 120. In some embodiments, the local variance threshold may be a value related to the average value of multiple local variances related to multiple landmark points (e.g., the 14 landmark points shown in FIG. 16). In some embodiments, the gradient threshold may be a value related to the average value of multiple average gradients related to multiple characteristic regions (e.g., the three characteristic regions shown in FIG. 18). In some embodiments, the edge width threshold may be a value related to the average value of multiple edge widths related to multiple landmark points (e.g., the 14 landmark points shown in FIG. 16).

In 908, the evaluation module 420 (e.g., the feature evaluation unit 530) may determine whether the definition of the face in the image satisfies a second condition.

In some embodiments, the second condition may depend on the relationship between the value of the parameter related to the definition of the face and the definition threshold. For example, the second condition may include that each of the local variances related to the multiple landmark points (e.g., the 14 landmark points shown in FIG. 16) is more than the local variance threshold. As another example, the second condition may include that at least a portion of the local variances related to multiple landmark points (e.g., 8 landmark points of the 14 landmark points) are more than the local variance threshold. As still another example, the second condition may include that each of the average gradients related to the characteristic regions (e.g., three characteristic regions shown in FIG. 18) is more than the gradient threshold. As still another example, the second condition may include that at least a portion of the average gradients related to the multiple characteristic regions (e.g., 2 characteristic regions of the 3 characteristic regions) are more than the local variance threshold. As still another example, the second condition may include that the average edge widths of multiple landmark points (e.g., the 14 landmark points shown in FIG. 16 or a part thereof) are more than the edge width threshold.

If the definition of the face does not satisfy the second condition, the process 900 may proceed to 916. If the definition of the face satisfies the second condition, the process 900 may proceed to 910.

In 910, the evaluation module 420 (e.g., the feature evaluation unit 530) may evaluate a confidence value of the face based on the relationship between the confidence value of the face and a confidence range. As described elsewhere in the disclosure, the confidence value of the face that indicates whether the face is occluded may be determined by performing statistical analysis on a plurality of positive samples, e.g., images including occluded face and images including nonoccluded face. The confidence range may be a default range stored in a storage device (e.g., the storage device 140) or a parameter set by a user of the image processing device 120.

In 912, the evaluation module 420 (e.g., the feature evaluation unit 530) may determine whether the face in the image is occluded according to a third condition. In some embodiments, the third condition may include that the confidence value of the face is within the confidence range. If the confidence value of the face is within the confidence range, the evaluation module 420 (e.g., the feature evaluation unit 530) may determine that the face in the image is not occluded, and direct the process 900 to 914. If the confidence value of the face is beyond the confidence range, the evaluation module 420 (e.g., the feature evaluation unit 530) may determine that face in the image is occluded, and determine the image as unqualified in 916.

It should be noted that the above description for evaluating the quality of the image including a face is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the operations 906 and 908, or the operations 910 and 912 may be removed from the process 900.

Figure 10:
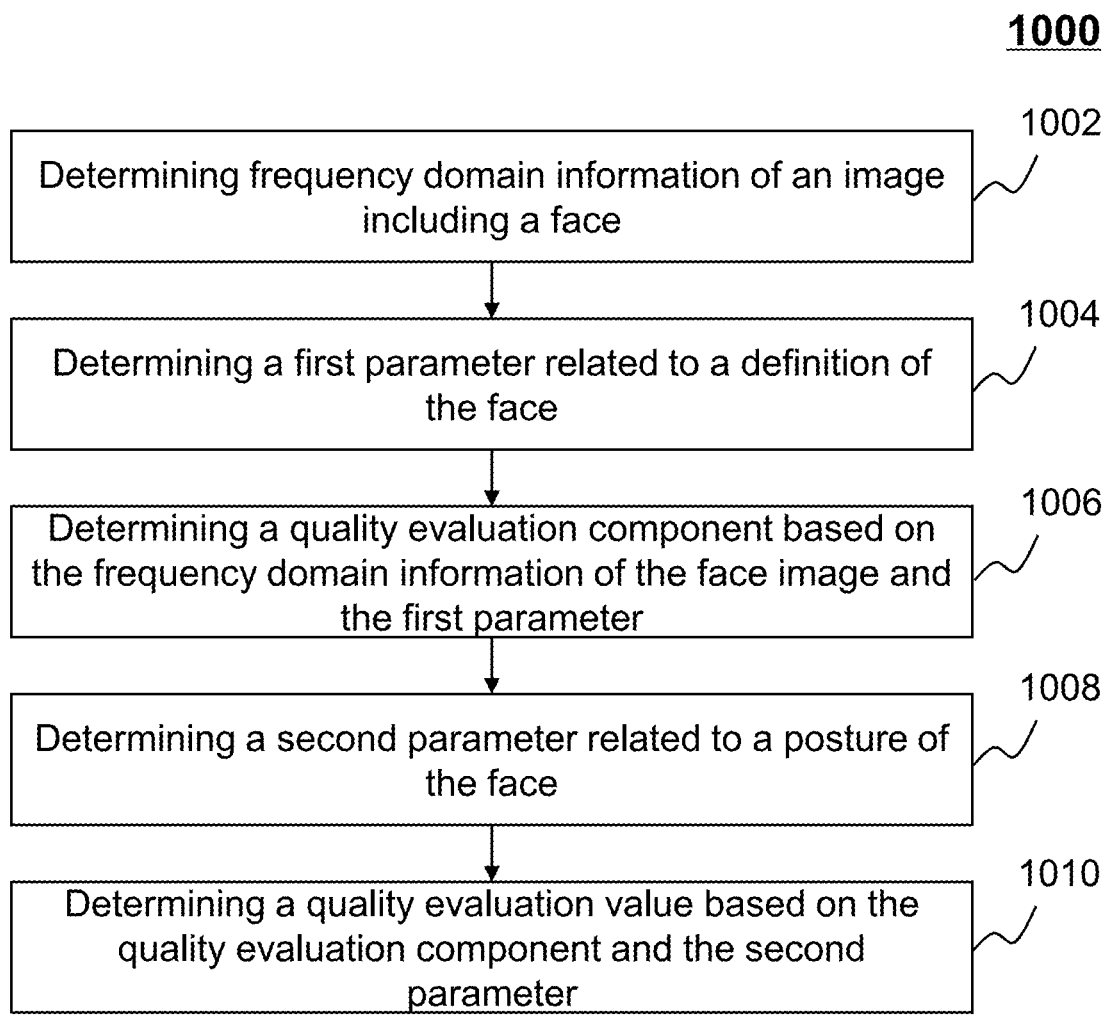
FIG. 10 is a flowchart illustrating an exemplary process for determining a quality evaluation value of an image including a face according to some embodiments of the present disclosure.

FIG. 10 is a flowchart illustrating an exemplary process 1000 for determining a quality evaluation value of an image including a face according to some embodiments of the present disclosure. The process 1000 may be implemented as a set of instructions (e.g., an application) stored in the storage ROM 230, RAM 240 or hardware and/or software components of a device 300. The processor 220 and/or the device 300 may execute the set of instructions, and when executing the instructions, it may be configured to perform the process 1000. The operations of the illustrated process presented below are intended to be illustrative. In some embodiments, the process 1000 may be accomplished with one or more additional operations not described and/or without one or more of the operations discussed. Additionally, the order in which the operations of the process as illustrated in FIG. 10 and described below is not intended to be limiting.

In 1002, the evaluation module 420 (e.g., the quality evaluation unit 540) may determine frequency domain information of an image including a face. More descriptions regarding the determination of frequency domain information may be found elsewhere in the disclosure, for example, the operation 808 in FIG. 8 and the description thereof.

In 1004, the evaluation module 420 (e.g., the quality evaluation unit 540) may determine a first parameter related to the definition of the face. In some embodiments, the first parameter may be determined according to a specific parameter associated with the definition of the face, e.g., an edge width related to one or more landmark points on the face. For example, the evaluation module 420 (e.g., the quality evaluation unit 540) may divide different value ranges related to the edge width according to a threshold associated with the contrast of the image. Each of the different value ranges may correspond to a different value of the first parameter. In some embodiments, the evaluation module 420 (e.g., the quality evaluation unit 540) may determine an average edge width of multiple landmark points on the face. As such, if the average edge width resides in a smaller value range, the first parameter may have a larger value. And, if the first average edge width resides in a larger value range, the first parameter may have a smaller value.

In 1006, the evaluation module 420 (e.g., the quality evaluation unit 540) may determine a quality evaluation component based on the frequency domain information of the face image and the first parameter. In some embodiments, the evaluation module 420 (e.g., the quality evaluation unit 540) may determine the quality evaluation component by multiplying the frequency domain information with the first parameter.

For illustration purpose, the quality evaluation component may be determined according to formula (8) below:

$$Q_1 = \begin{cases} \alpha * S_f & S_e < \varepsilon * T_e \\ \beta * S_f & S_e < \epsilon * T_e \\ S_f & others \end{cases} \quad (8)$$

where $Q_1$ refers to the quality evaluation component of the image, $S_f$ refers to the sum of all weighted pixel values of the Fourier transformed image (i.e., the frequency domain information), $S_e$ refers to the average edge width of multiple landmark points on the face, $T_e$ refers to the threshold associated with the contrast ratio of the image, $\alpha$ refers to the value of the first parameter (e.g., $\alpha$ is 1.2), $\beta$ refers to the value of the second parameter described below (e.g., $\beta$ is 0.8), $\varepsilon$ and $\epsilon$ refer to coefficients related to an application scenario. The coefficients $\varepsilon$ or $\epsilon$ may be changed according to different application scenarios (e.g., different requirements on the quality of the image). For example, $\varepsilon$ is set to 0.2, and $\epsilon$ is set to 0.8. The threshold $T_e$ may be determined by the similar method with the determination of the gray difference threshold TH of the characteristic region, which may be found elsewhere (e.g., in formulae (4) to (7) and the descriptions thereof) in the present disclosure.

In 1008, the evaluation module 420 (e.g., the quality evaluation unit 540) may determine a second parameter related to the posture of the face. In some embodiments, the second parameter may be determined according to a specific parameter associated with the posture of the face, e.g., the rotational angle of the face with respect to an axis (e.g., the deflection anlge Sa_yaw, or the pitch angle Sa_pitch). For example, the evaluation module 420 (e.g., the quality evaluation unit 540) may divide different angle ranges. Each of the different angle range may correspond to a different value of the second parameter. In some embodiments, if the rotational angle of the face with respect to an axis resides in a smaller angle range (e.g., the Sa_yaw and/or Sa_pitch is in a smaller range), the second parameter may have a larger value. And, if the rotational angle of the face with respect to an axis resides in a larger angle range (e.g., the Sa_yaw and/or Sa_pitch is in a larger range), the second parameter may have a smaller value.

In 1010, the evaluation module 420 (e.g., the quality evaluation unit 540) may determine a quality evaluation value based on the quality evaluation component and the second parameter. In some embodiments, the evaluation module 420 (e.g., the quality evaluation unit 540) may determine the quality evaluation value of the image by multiplying the quality evaluation component with the second parameter.

For example, after the frequency domain information of the image is determined according to formula (8), the quality evaluation value of the image may be determined according to formula (9) below:

$$Q = \begin{cases} 1.2 * Q_1 & |Sa\_yaw| < 5 \text{ and } |Sa\_pitch| < 5 \\ 0.9 * Q_1 & |Sa\_yaw| > 15 \text{ or } |Sa\_pitch| > 20 \\ 0.8 * Q_1 & |Sa\_yaw| > 20 \text{ and } |Sa\_pitch| > 20 \\ Q_1 & \text{others} \end{cases} \quad (9)$$

where $Q_1$ refers to the quality evaluation component of the image, Q refers to the quality evaluation value of the image, Sa_yaw refers to the deflection angle of the face with respect to the YAW axis, Sa_pitch refers to the pitch angle of the face with respect to the PITCH axis. It shall be noted that the quality evaluation value of the image may have a larger value if the face in the image is rotated by a small rotational angle (e.g., smaller deflection angle Sa_yaw and/or Sa_pitch).

It should be noted that the above description for quality evaluation of the image including a face is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operations 1004 and 1006 may be combined to one operation. As another example, operations 1008 and 1010 may be combined to one operation.

Figure 11:
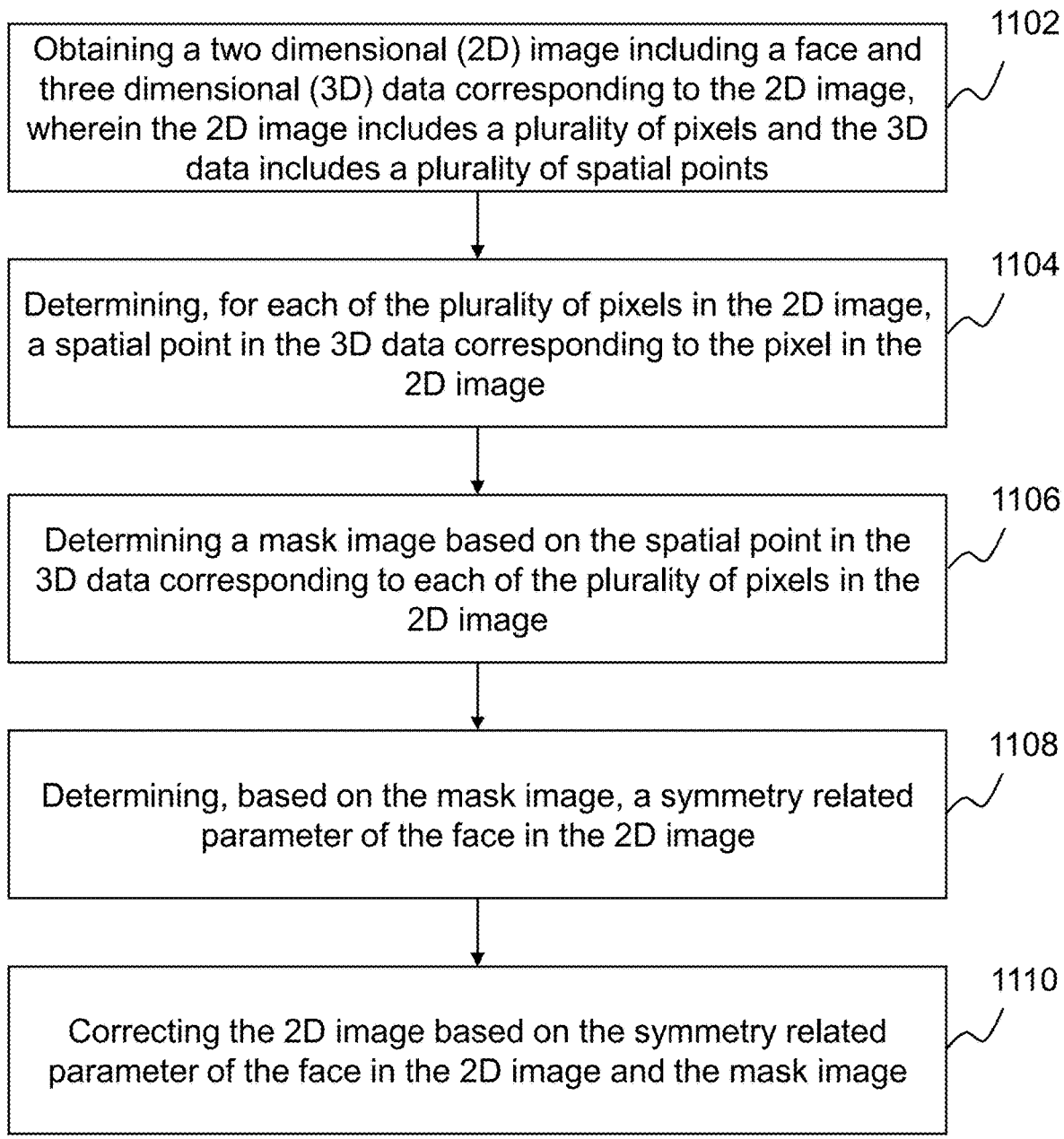
FIG. 11 is a flowchart illustrating an exemplary process for correcting a two-dimensional (2D) image according to some embodiments of the present disclosure.

FIG. 11 is a flowchart illustrating an exemplary process 1100 for correcting a 2D image including a face according to some embodiments of the present disclosure. The process 1100 may be implemented as a set of instructions (e.g., an application) stored in the storage ROM 230, RAM 240 or hardware and/or software components of a device 300. The processor 220 and/or the device 300 may execute the set of instructions, and when executing the instructions, it may be configured to perform the process 1100. The operations of the illustrated process presented below are intended to be illustrative. In some embodiments, the process 1100 may be accomplished with one or more additional operations not described and/or without one or more of the operations discussed. Additionally, the order in which the operations of the process as illustrated in FIG. 11 and described below is not intended to be limiting.

In 1102, the correction module 430 (e.g., the data acquisition unit 610) may obtain a two dimensional (2D) image including a face and three dimensional (3D) data corresponding to the 2D image. The 2D image may include a plurality of pixels (also referred to as pixel points) and the 3D data may include a 3D image or 3D model which comprises a plurality of voxels (also referred to as spatial points). In some embodiments, the plurality of pixels in the 2D image may be represented by X and Y coordinates, and the spatial points in the 3D data may be represented by X, Y, and Z coordinates.

In 1104, the correction module 430 (e.g., the point determination unit 620) may determine, for each of the plurality of pixels in the 2D image, a spatial point in the 3D data corresponding to the pixel in the 2D image. In some embodiment, the correction module 430 (e.g., the point determination unit 620) may determine the spatial point in the 3D data and the corresponding pixel in the 2D image based on a projection matrix. The projection matrix may be a matrix representing the relationship between the pixels in the 2D image and the spatial points in the 3D data. More description regarding the determination of the projection matrix may be found elsewhere (e.g., FIG. 12 and the description thereof) in the present disclosure.

Figure 24:
FIG. 24 is a schematic diagram illustrating an exemplary image including a face according to some embodiments of the present disclosure.
Figure 25:
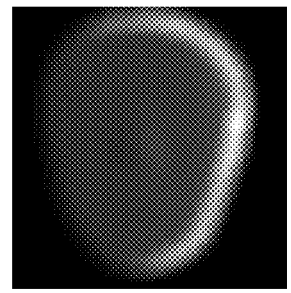
FIG. 25 is a schematic diagram illustrating an exemplary mask image of an image including a face according to some embodiments of the present disclosure.

In 1106, the correction module 430 (e.g., the mask image determination unit 630) may determine a mask image based on the spatial points in the 3D data corresponding to the plurality of pixels in the 2D image. The mask image may be a 2D image which includes symmetry related information of the face in the 2D image. For illustration purpose, FIG. 25 shows an exemplary mask image for the 2D image including a face as shown in FIG. 24.

In some embodiments, for each pixel of the mask image, the correction module 430 (e.g., the mask image determination unit 630) may associate the normal direction of a corresponding the spatial point in the 3D data with the value of the pixel. Thus, if a part of the face is directly facing the imaging device (e.g., the imaging device 110), the normal lines of the spatial points in the 3D data corresponding to the part of the face may be parallel to the Z direction, or have a relatively small angle with the Z direction. And, if a part of the face is not directly facing the imaging device, the angle between the directions of normal line of the spatial points in the 3D data corresponding to the part may form a relatively large angle with the Z direction. In some embodiments, if the angle formed by the Z direction and the normal line of a spatial point in the 3D data is greater than 45°, the part of the face where the spatial point is located may be regarded as occluded or partially occluded. As used herein, the Z direction may refer to the direction which is perpendicular to the plane of the 2D image.

In 1108, the correction module 430 (e.g., the symmetry determination unit 640) may determine a symmetry related parameter of the face in the 2D image based on the mask image. In some embodiments, as the pixel values are associated with the normal lines of spatial points in the mask image, different portions of the mask image may be processed according to a specific algorithm to form the symmetry related parameter of the face. More descriptions for determining the symmetry related parameter of the face in the 2D image may be found elsewhere (e.g., the process 1300 in FIG. 13 and the description thereof) in the present disclosure.

In 1110, the correction module 430 (e.g., the correcting unit 650) may correct the 2D image based on the symmetry related parameter of the face in the 2D image and the mask image. In some embodiments, the correction module 430 may correct the 2D image to present the front view of the face in a corrected 2D image. More description for correcting the 2D image based on the symmetry related parameter of the face in the 2D image may be found elsewhere (e.g., FIG. 14 and the description thereof) in the present disclosure.

It should be noted that the above description for correcting the 2D image including a face is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operations 1104 and 1106 may be combined to one operation.

FIG. 12 is a flowchart illustrating an exemplary process 1200 for determining, for each of the plurality of pixels in a 2D image including a face, a spatial point in a 3D data corresponding to a pixel in the 2D image according to some embodiments of the present disclosure. The process 1200 may be implemented as a set of instructions (e.g., an application) stored in the storage ROM 230, RAM 240 or hardware and/or software components of a device 300. The processor 220 and/or the device 300 may execute the set of instructions, and when executing the instructions, it may be configured to perform the process 1200. The operations of the illustrated process presented below are intended to be illustrative. In some embodiments, the process 1200 may be accomplished with one or more additional operations not described and/or without one or more of the operations discussed. Additionally, the order in which the operations of the process as illustrated in FIG. 12 and described below is not intended to be limiting.

In 1202, the correction module 430 (e.g., the data acquisition unit 610) may obtain a 2D image including a face and 3D data corresponding to the 2D image as described in connection with operation 1102.

In 1204, the correction module 430 (e.g., the point determination unit 620) may determine at least one pixel point in the 2D image. As described in connection with FIG. 8, the at least one pixel point may include a landmark point, e.g., an edge point of a facial feature (e.g., a mouth corner point, an eye corner point) of the face in the 2D image. In some embodiments, the at least one pixel point in the 2D image may include landmark points as described elsewhere in the disclosure and interpolation points that are interpolated between the landmark points.

In 1206, the correction module 430 (e.g., the point determination unit 620) may determine at least one spatial point in the 3D data corresponding to the at least one pixel point in the 2D image. In some embodiments, the correction module 430 may determine the at least one spatial point in the 3D data based on a mapping process. For example, in a mapping process, the correction module 430 may identify the X, Y coordinates of the at least one pixel point in the 2D image, and then determine the at least one spatial point in the 3D data by identifying spatial points having same X, Y coordinates with that of the at least one pixel point in the 2D image.

In 1208, the correction module 430 (e.g., the point determination unit 620) may determine a projection matrix based on the at least one spatial point in the 3D data and a template 3D model of face. The projection matrix may be a matrix representing a relationship between the spatial points in the 3D data and the pixel points in the 2D images (e.g., the rotation matrix R, the translation matrix T illustrated in formula (10)).

In some embodiments, the template 3D model of face may be generated based on a plurality of 2D images and corresponding 3D data. For each 2D image, multiple landmark points (e.g., the eye corner points, upper and lower edge points of the left eye and/or the right eye) may be extracted. Then, a mapping process as described elsewhere in the disclosure may be performed to map corresponding spatial points in the 3D data with the landmark points of the plurality of 2D images. For example, a plurality of left eye corner points may be identified in the 3D data. Then, an average coordinate of the left eye corner point may be determined according to the plurality of left eye corner points in the 3D data. Similarly, the average coordinate of the upper edge point of the left/right eye, or the lower edge point of the left/right eye may be determined. Thus, the template 3D model of face may be determined according to the average coordinates of various spatial points in the 3D data.

In 1210, the correction module 430 (e.g., the point determination unit 620) may determine a relationship between the 2D image and the 3D data based on the projection matrix. Merely by way of example, the relationship between the 2D image and the 3D data may be illustrated by formula (10) below:

$$X_{2D} = \begin{bmatrix} F_x & 0 & C_x & 0 \\ 0 & F_y & C_y & 0 \\ 0 & 0 & 1 & 0 \end{bmatrix} \begin{bmatrix} R & T \\ 0 & 1 \end{bmatrix} \begin{bmatrix} x \\ y \\ z \\ 1 \end{bmatrix} = M_1 M_2 X_{3D} \quad (10)$$

where $X_{2D}$ refers to a matrix associated with the plurality of pixel points in the 2D image, $X_{3D}$ refers to a matrix associated with the plurality of spatial points in the 3D data, $F_x$, $F_y$, $C_x$, and $C_y$ refer to camera parameters, R refers to a rotation matrix, T refers to a translation matrix, and $M_1 M_2$, which is defined by the camera parameters, the rotation matrix and the translation matrix, refers to the projection matrix.

In 1212, the correction module 430 (e.g., the point determination unit 620) may determine, for each of the plurality of pixel points in the 2D image, a corresponding spatial point in the 3D data to a pixel in the 2D image based on the relationship between the 2D image and the 3D data.

It should be noted that the above description for determining a spatial point in the 3D data is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operations 1204 and 1206 may be combined to one operation.

Figure 13:
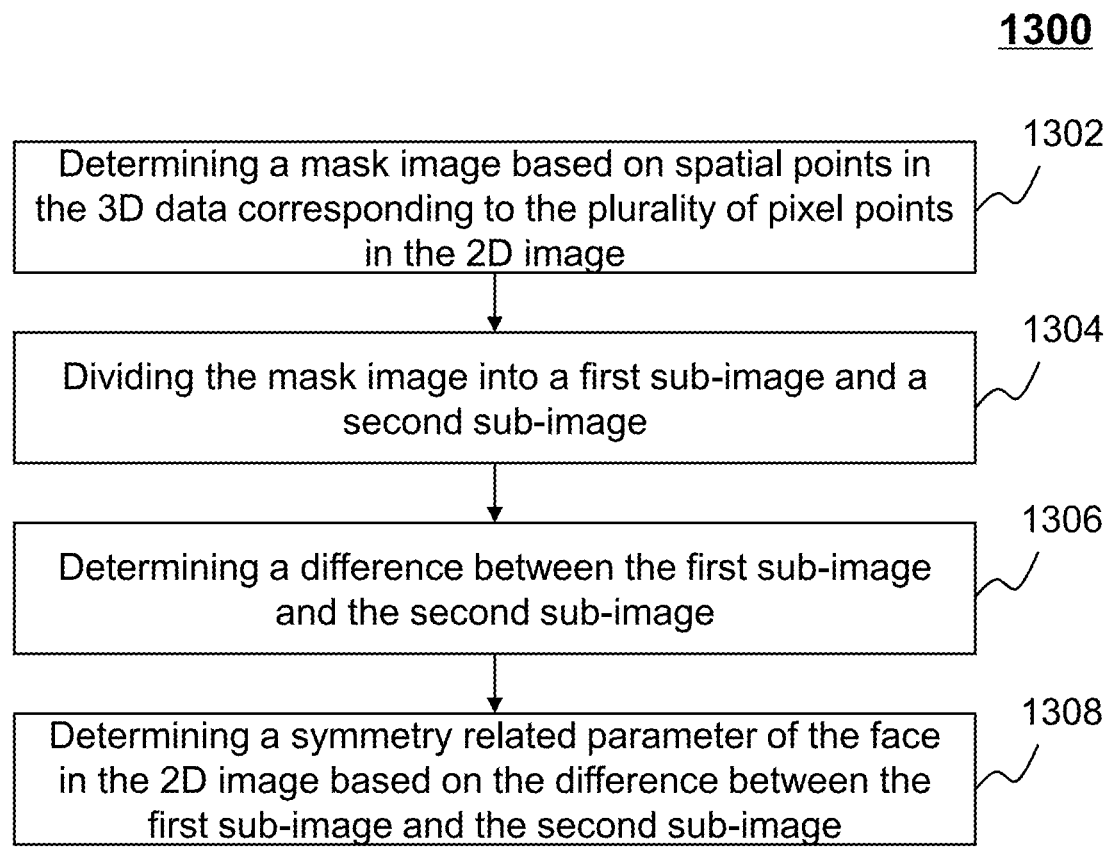
FIG. 13 is a flowchart illustrating an exemplary process for determining a symmetry related parameter of the face in a 2D image according to some embodiments of the present disclosure.

FIG. 13 is a flowchart illustrating an exemplary process 1300 for determining a symmetry related parameter of the face in a 2D image according to some embodiments of the present disclosure. The process 1300 may be implemented as a set of instructions (e.g., an application) stored in the storage ROM 230, RAM 240 or hardware and/or software components of a device 300. The processor 220 and/or the device 300 may execute the set of instructions, and when executing the instructions, it may be configured to perform the process 1300. The operations of the illustrated process presented below are intended to be illustrative. In some embodiments, the process 1300 may be accomplished with one or more additional operations not described and/or without one or more of the operations discussed. Additionally, the order in which the operations of the process as illustrated in FIG. 13 and described below is not intended to be limiting.

In 1302, the correction module 430 (e.g., the mask image determination unit 630) may determine a mask image based on spatial points in the 3D data corresponding to the plurality of pixel points in the 2D image. In some embodiments, for each pixel in the mask image, the pixel value may be in associated with the normal line of a spatial point in the 3D data corresponding to the pixel. For illustration purpose, the correction module 430 may determine the values of the pixels in the mask image based on a binary threshold. The binary threshold may be a default value stored in a storage device (e.g., the storage device 140) or a value set by a user of the image processing device 120. For example, if a pixel in the mask image corresponding to a spatial point in the 3D data of which the angle between the normal line and the Z direction is greater than 45°, the value of the pixel in the mask image may be set to 1, otherwise, the value of the pixel may be set to 0.

In 1304, the correction module 430 (e.g., the mask image determination unit 630) may divide the mask image into a first sub-image and a second sub-image. The correction module 430 may symmetrically divide the mask image along the vertical center line to generate a left mage (i.e., the first sub-image) and a right image (i.e., the right sub-image).

In 1306, the correction module 430 (e.g., the symmetry determination unit 640) may determine a difference between the first sub-image and the second sub-image. The correction module 430 may determine the sum of the pixel values in the first sub-image and the sum of the pixel values in the second sub-image, respectively. The difference between the first sub-image and the second sub-image may be in associated with the difference between the sum of the pixel values in the first sub-image and the sum of the pixel values in the second sub-image. Further, the correction module 430 may normalize the difference between the first sub-image and the second sub-image such that the normalized difference may be within a preset range.

In 1308, the correction module 430 (e.g., the symmetry determination unit 640) may determine a symmetry related parameter of the face in the 2D image based on the difference between the first sub-image and the second sub-image. For example, the symmetry related parameter of the face in the 2D image may be determined according to formula (11) below:

$$Wlr = [Wlr(1)\ Wlr(2)] = \begin{cases} [0.1\ 1.9] & |Sdiff| > 0.3 \\ [1.5\ 1.5] & 0.15 < |Sdiff| < 0.3 \\ [1.0\ 1.0] & \text{others} \end{cases} \quad (11)$$

where Wlr refers to the symmetry related parameter of the face in the 2D image, Wlr(1) refers to the first symmetry related parameter of the first sub-image, Wlr(2) refers to the second symmetry related parameter of the second sub-image, and Sdiff refers to the normalized difference between the first sub-image and the second sub-image. It shall be noted that the smaller the normalized difference is, the more symmetrical the face in the 2D image is.

It should be noted that the above description for determining the symmetry related parameter of the face in a 2D image is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the values of the first symmetry related parameter of the first sub-image and the second symmetry related parameter of the second sub-image may be set to other value, such as [0.2 2.0].

Figure 14:
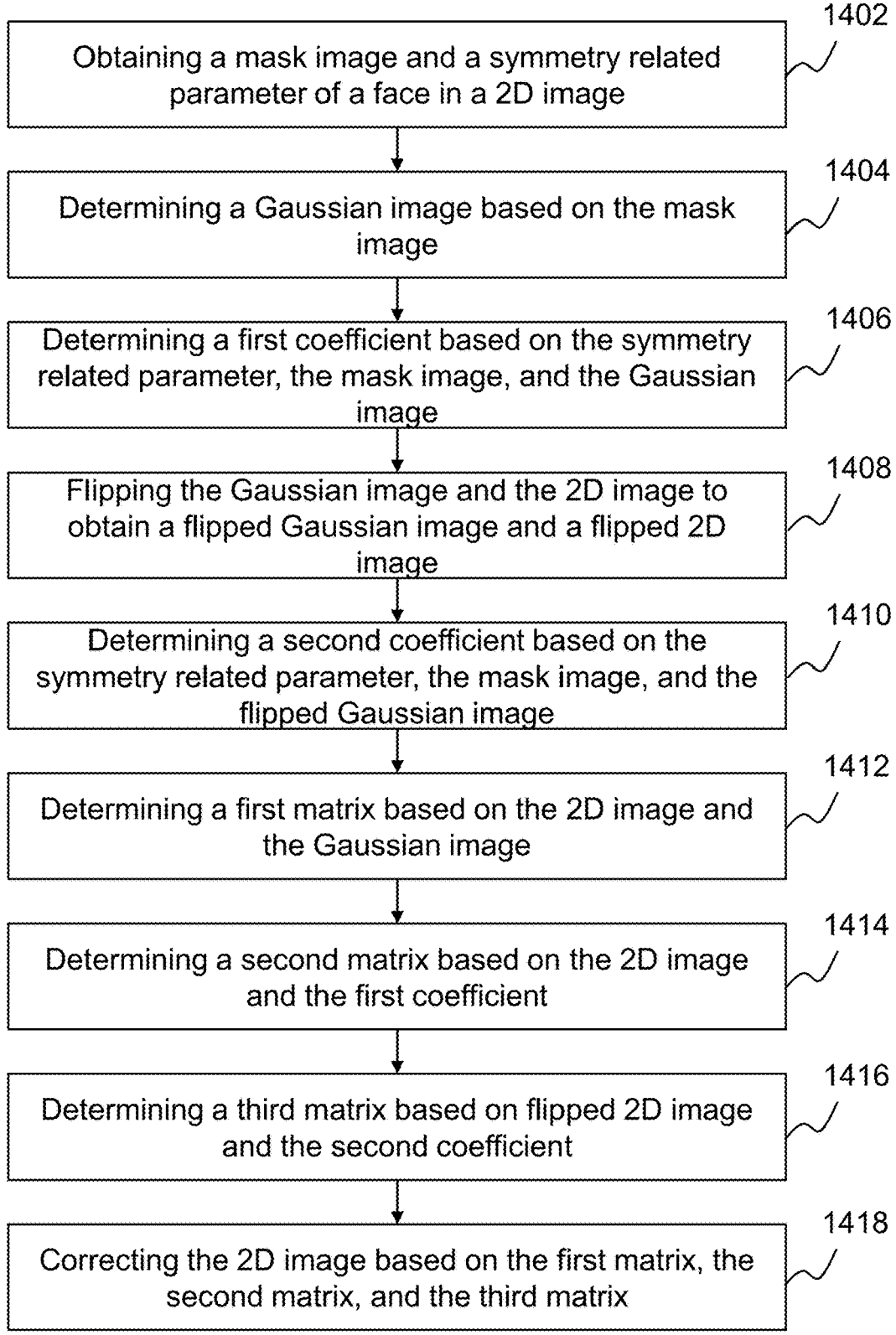
FIG. 14 is a flowchart illustrating an exemplary process for correcting a 2D image according to some embodiments of the present disclosure.

FIG. 14 is a flowchart illustrating an exemplary process 1400 for correcting a 2D image according to some embodiments of the present disclosure. The process 1400 may be implemented as a set of instructions (e.g., an application) stored in the storage ROM 230, RAM 240 or hardware and/or software components of a device 300. The processor 220 and/or the device 300 may execute the set of instructions, and when executing the instructions, it may be configured to perform the process 1400. The operations of the illustrated process presented below are intended to be illustrative. In some embodiments, the process 1400 may be accomplished with one or more additional operations not described and/or without one or more of the operations discussed. Additionally, the order in which the operations of the process as illustrated in FIG. 14 and described below is not intended to be limiting.

In 1402, the correction module 430 may obtain a mask image and a symmetry related parameter of a face in a 2D image as described in connection with operations 1304 and 1308. In some embodiments, the correction module 430 may normalize the mask image to render the pixel values of the normalized mask image within a specific range, e.g., from 0 to 1.

Figure 26:
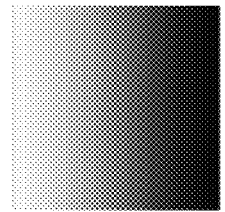
FIG. 26 is a schematic diagram illustrating an exemplary Gaussian image according to some embodiments of the present disclosure.

In 1404, the correction module 430 (e.g., the correcting unit 650) may determine a Gaussian image by performing a Gaussian transformation on the mask image. In some embodiments, the correction module 430 may determine the Gaussian image by performing Gaussian kernel blurring on the mask image. Taking the Gaussian image shown in FIG. 26 as an example, the Gaussian image may be obtained by performing the one-dimensional Gaussian downward broadening process on the mask image shown in FIG. 25.

In 1406, the correction module 430 (e.g., the correcting unit 650) may determine a first coefficient based on the symmetry related parameter, the mask image, and the Gaussian image. For example, the correction module 430 may determine the first coefficient based on formulae (12), (13) and (14) below:

$$\alpha = W_{org} * Wlr(1) \quad (12)$$

$$W_{org} = W_{gauss} * W0_{org} \quad (13)$$

$$W0_{org} = 1/\exp(0.5 I_{mask}) \quad (14)$$

where α refers to the first coefficient, Wlr(1) refers to the first symmetry related parameter of the first sub-image, $W_{gauss}$ refers to the pixel matrix of the Gaussian image, and $I_{mask}$ refers to the pixel matrix of the normalized mask image.

In 1408, the correction module 430 (e.g., the correcting unit 650) may flip the Gaussian image and the 2D image. To flip an image may indicate symmetrically turning the left side of the image to the right, and turning the right side of the image to the left.

In 1410, the correction module 430 (e.g., the correcting unit 650) may determine a second coefficient based on the symmetry related parameter, the mask image, and the flipped Gaussian image. For example, the correction module 430 may determine the second coefficient based on formula (15), (16), (17) and (18) below:

$$b = W_{sym} \cdot Wlr(2) \tag{15}$$

$$W_{sym} = W_{gauss}' \cdot W0_{sym} \tag{16}$$

$$W0_{sym} = 1 - W0_{org} \tag{17}$$

where b refers to the second coefficient, Wlr(2) refers to the second symmetry related parameter of the second sub-image, $W_{gauss}'$ refers to the pixel matrix of the flipped Gaussian image, and $W0_{org}$ is determined according to formula (14).

In 1412, the correction module 430 (e.g., the correcting unit 650) may determine a first matrix based on the 2D image and the Gaussian image.

For example, the correction module 430 may determine the first matrix based on formula (18) below:

$$I_1 = I_{scr} \cdot W_{gauss} \tag{18}$$

where $I_1$ refers to the first matrix, $W_{gauss}$ refers to the pixel matrix of the Gaussian image, and $I_{scr}$ refers to the pixel matrix of the 2D image.

In 1414, the correction module 430 (e.g., the correcting unit 650) may determine a second matrix based on the 2D image and the first coefficient.

For example, the correction module 430 may determine the second matrix based on formula (19) below:

$$I_2 = I_{scr} \cdot a \tag{19}$$

where $I_2$ refers to the second matrix.

In 1416, the correction module 430 (e.g., the correcting unit 650) may determine a third matrix based on the flipped 2D image and the second coefficient.

For example, the correction module 430 may determine the third matrix based on formula (20) below:

$$I_3 = I_{scrlr} \cdot b \tag{20}$$

where $I_3$ refers to the third matrix, and $I_{scrlr}$ refers to the pixel matrix of the flipped 2D image.

In 1418, the correction module 430 (e.g., the correcting unit 650) may correct the 2D image based on the first matrix, the second matrix, and the third matrix. The correction module 430 may determine the corrected matrix of the 2D image by adding up the first matrix, the second matrix, and the third matrix.

For example, the correction module 430 (e.g., the correcting unit 650) may determine the third matrix based on formula (21) below:

$$I = I_1 + I_2 + I_3 \tag{21}$$

where $I_3$ refers to the pixel matrix of the corrected 2D image.

It should be noted that the above description for correcting the 2D image is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operations 1412, 1414 and 1416 may be combined to one operation.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB.

NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A face recognition electronic system, comprising:
   one or more image obtaining units configured to obtain an image;
   one or more image processing units connected to the one or more image obtaining units, wherein during operation the one or more image processing units:
   obtain an image including a face;
   determine at least one time domain feature related to the face in the image, the at least one time domain feature related to the face indicating one or more features of the face presented in the image at a time spot and including a rotational angle of the face with respect to an axis or a confidence value of the face indicating whether the face is occluded;
   determine at least one frequency domain information related to the face in the image; and
   evaluate a quality of the image based on the at least one time domain feature and the frequency domain information.

2. The system of claim 1, wherein to evaluate the quality of the image, the one or more image processing units:
   determine whether the at least one time domain feature satisfies a condition;
   in response to a determination that the at least one time domain feature satisfies the condition, evaluate the quality of the image based on the frequency domain information.

3. The system of claim 1, wherein the at least one time domain feature related to the face includes at least one of a posture of the face, or a definition of the face in the image.

4. The system of claim 3, wherein to determine the definition of the face in the image, the one or more image processing units:
   extract at least one landmark point in the image, the at least one landmark point being with respect to a region of interest of the face;
   determine at least one neighboring point of the at least one landmark point; and
   determine, based on the at least one landmark point and the at least one neighboring point, a local variance related to the at least one landmark point, an average gradient related to the at least one landmark point, or an edge width related to the at least one landmark point in the image.

5. The system of claim 3, wherein to evaluate the quality of the image, the one or more image processing units:
   determine a value of a first parameter, the first parameter related to the definition of the face;
   determine a value of a second parameter, the second parameter related to the posture of the face; and
   determine a quality evaluation value of the image based on the value of the first parameter and the value of the second parameter.

6. The system of claim 1, wherein to determine the at least one frequency domain information of the image, the one or more image processing units:
   perform the time-to-frequency-domain transformation on one or more pixel values of the image;
   weight the time-to-frequency-domain transformed one or more pixel values of the image based on a weighting matrix; and
   determine the at least one frequency domain information of the image based on the weighted pixel values of the image.

7. A method implemented on at least one image processing electronic device, the method comprising:
   obtaining an image including a face;
   determining at least one time domain feature related to the face in the image, the at least one time domain feature related to the face indicating one or more features of the face presented in the image at a time spot and including a rotational angle of the face with respect to an axis or a confidence value of the face indicating whether the face is occluded;
   determining at least one frequency domain information related to the face in the image; and
   evaluating a quality of the image based on the at least one time domain feature and the frequency domain information.

8. The method of claim 7, wherein the evaluating of the quality of the image includes:
   determining whether the at least one time domain feature satisfies a condition;
   in response to a determination that the at least one time domain feature satisfies the condition, evaluating the quality of the image based on the frequency domain information.

9. The method of claim 7, wherein the at least one time domain feature related to the face includes at least one of a posture of the face, or a definition of the face in the image.

10. The method of claim 9, wherein the determining of the definition of the face in the image includes:
- extracting at least one landmark point in the image, the at least one landmark point being with respect to a region of interest of the face;
- determining at least one neighboring point of the at least one landmark point; and
- determining, based on the at least one landmark point and the at least one neighboring point, a local variance related to the at least one landmark point, an average gradient related to the at least one landmark point, or an edge width related to the at least one landmark point in the image.

11. The method of claim 9, wherein the evaluating of the quality of the image includes:
- determining a value of a first parameter, the first parameter related to the definition of the face;
- determining a value of a second parameter, the second parameter related to the posture of the face; and
- determining a quality evaluation value of the image based on the value of the first parameter and the value of the second parameter.

12. The method of claim 7, wherein the determining of the at least one frequency domain information of the image includes:
- performing the time-to-frequency-domain transformation on one or more pixel values of the image;
- weighting the time-to-frequency-domain transformed one or more pixel values of the image based on a weighting matrix; and
- determining the at least one frequency domain information of the image based on the weighted pixel values of the image.

* * * * *